(12) United States Patent
Lafleur et al.

(10) Patent No.: US 6,668,650 B1
(45) Date of Patent: Dec. 30, 2003

(54) VIBRATION TESTING APPARATUS AND METHOD USING ACOUSTICAL WAVES

(75) Inventors: François Lafleur, Laprairie (CA); Marc Thomas, Montréal (CA); Frédéric Laville, Montréal (CA); Jacques Aubé, Laval (CA)

(73) Assignee: Intellium Technologies Inc., Montréal (CA)

(*) Notice: Subject to any disclaimer, the term of this patent is extended or adjusted under 35 U.S.C. 154(b) by 0 days.

(21) Appl. No.: 10/018,348

(22) PCT Filed: Jun. 28, 2000

(86) PCT No.: PCT/CA00/00784
§ 371 (c)(1),
(2), (4) Date: Dec. 19, 2001

(87) PCT Pub. No.: WO01/01103
PCT Pub. Date: Jan. 4, 2001

(30) Foreign Application Priority Data

Jun. 28, 1999 (CA) .............................................. 2276693

(51) Int. Cl.⁷ .......................... G01N 29/12; G01M 7/00
(52) U.S. Cl. .............................. 73/571; 73/579; 73/584; 73/662
(58) Field of Search ....................... 73/571, 579, 662, 73/663, 665, 432.1, 856.6, 584, 583, 586

(56) References Cited

U.S. PATENT DOCUMENTS

| 3,104,543 | A | * | 9/1963 | Kaminski | 73/571 |
| 3,198,007 | A | * | 8/1965 | Overton | 73/571 |
| 3,827,288 | A | * | 8/1974 | Fletcher et al. | 73/571 |
| 5,039,228 | A | * | 8/1991 | Chalmers | 374/57 |
| 5,138,884 | A | * | 8/1992 | Bonavia | 73/662 |
| 5,226,326 | A | * | 7/1993 | Polen et al. | 73/571 |
| 6,484,580 | B2 | * | 11/2002 | Eagen et al. | 73/571 |

* cited by examiner

Primary Examiner—Hezron Williams
Assistant Examiner—Rose M. Miller
(74) Attorney, Agent, or Firm—Jean-Claude Boudreau

(57) ABSTRACT

A vibration testing system using acoustical waves having a testing unit including a main enclosure defining a main acoustical cavity and having a baffle provided with a main opening which is aligned with a set of acoustical insulation bands receiving an article to be tested that are clamped on a fixture secured to the baffle, so that the main opening is substantially closed by the article and the acoustical insulation bands. The apparatus includes a main acoustical source comprising a main acoustical transducer such as a loudspeaker which is acoustically coupled to the main acoustical cavity, and a subsystem for driving the loudspeaker which generates acoustical waves imparting vibration to the article accordingly. The apparatus preferably also includes a further acoustical source in the form of one or more further loudspeakers facing the main loudspeaker with the baffle extending therebetween, the further loudspeakers showing complementary frequency operating ranges.

39 Claims, 17 Drawing Sheets

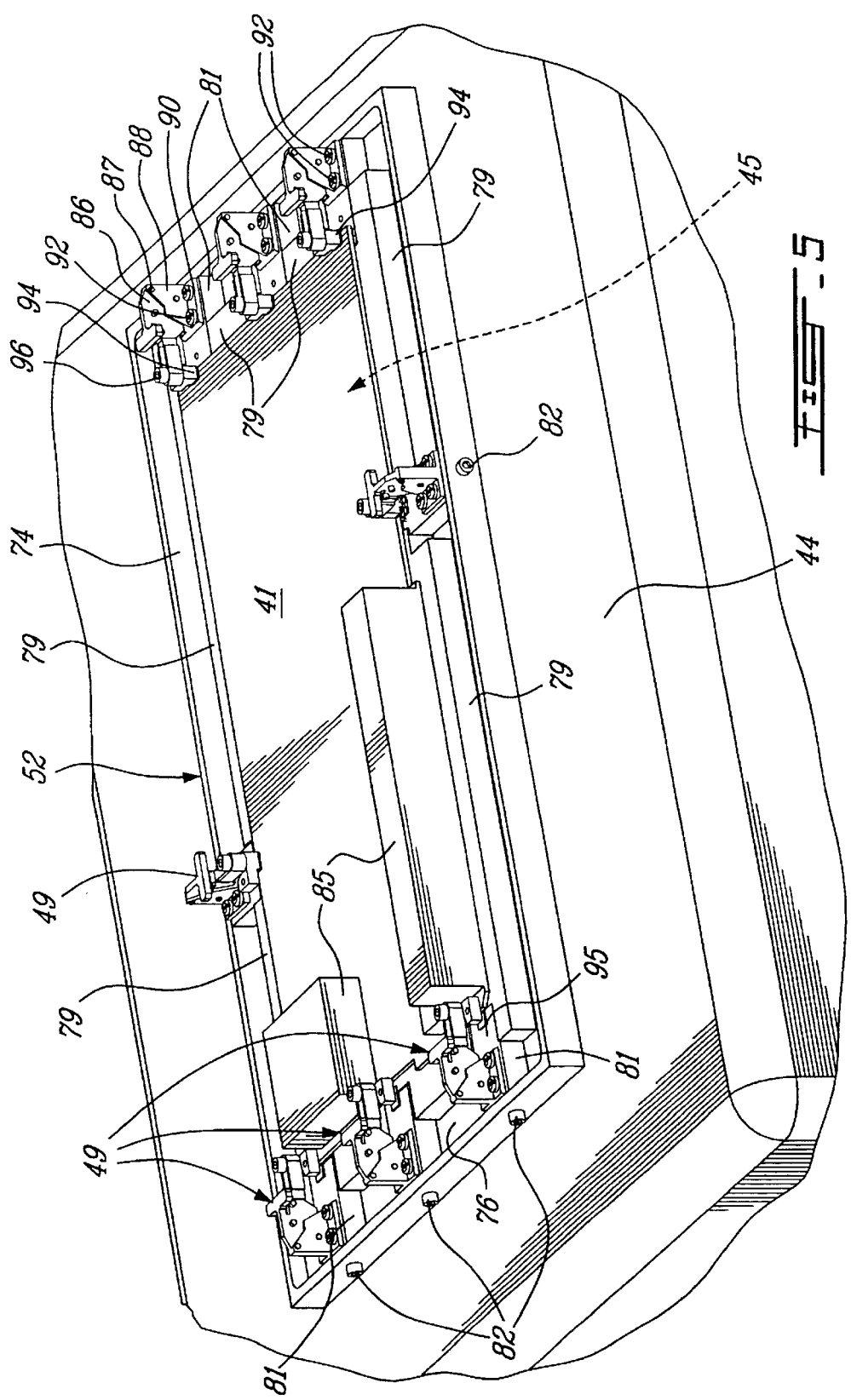

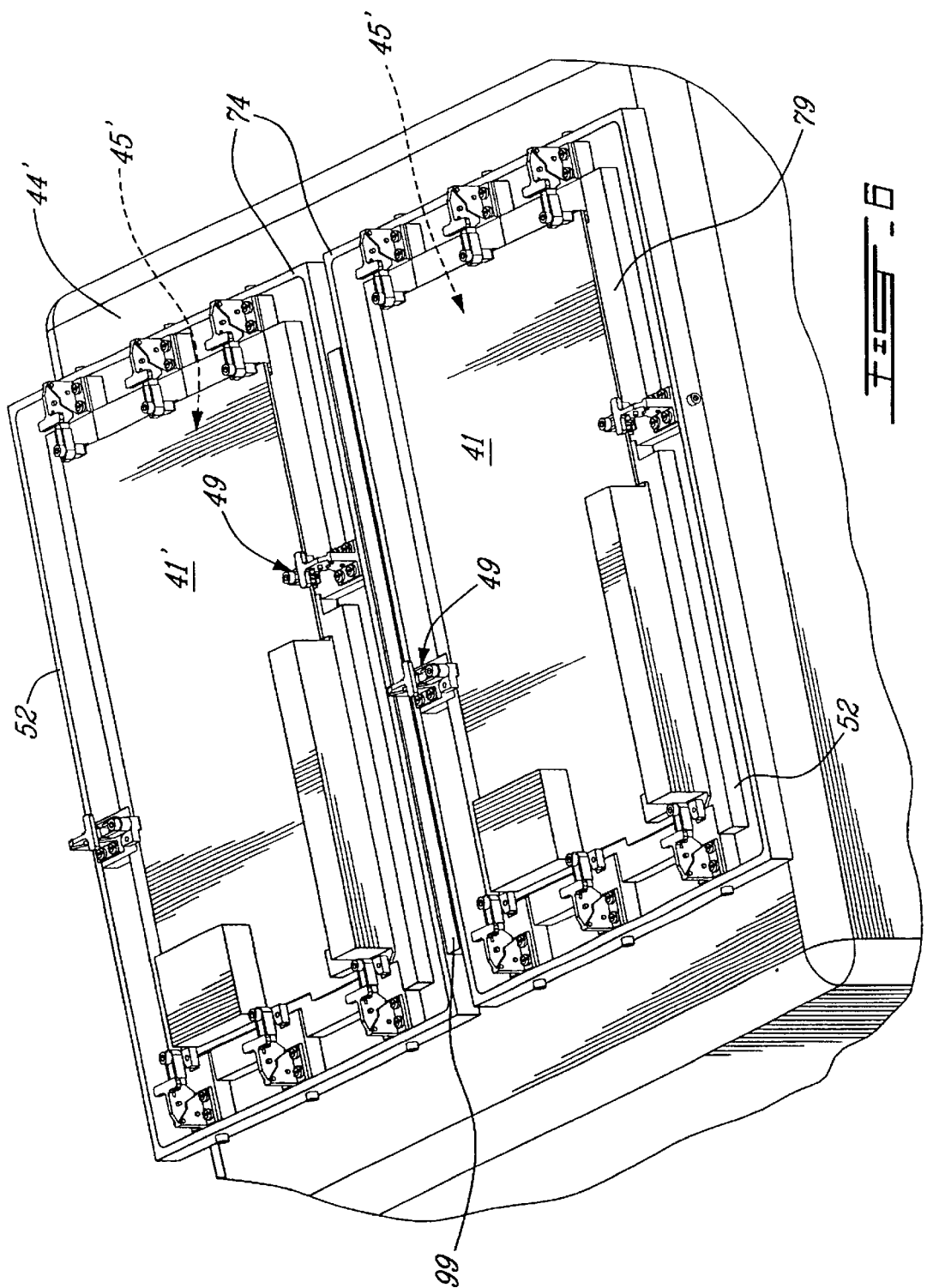

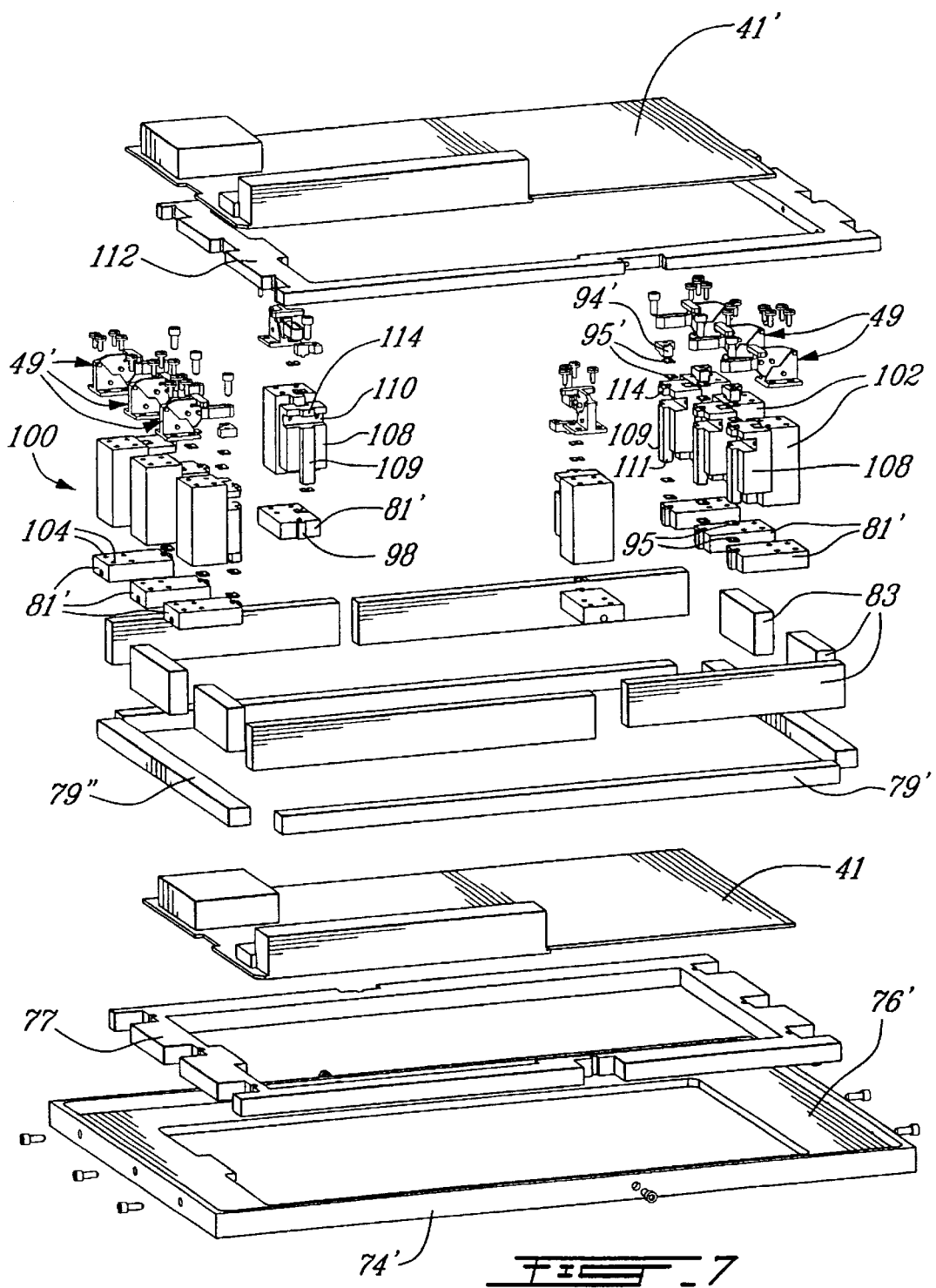

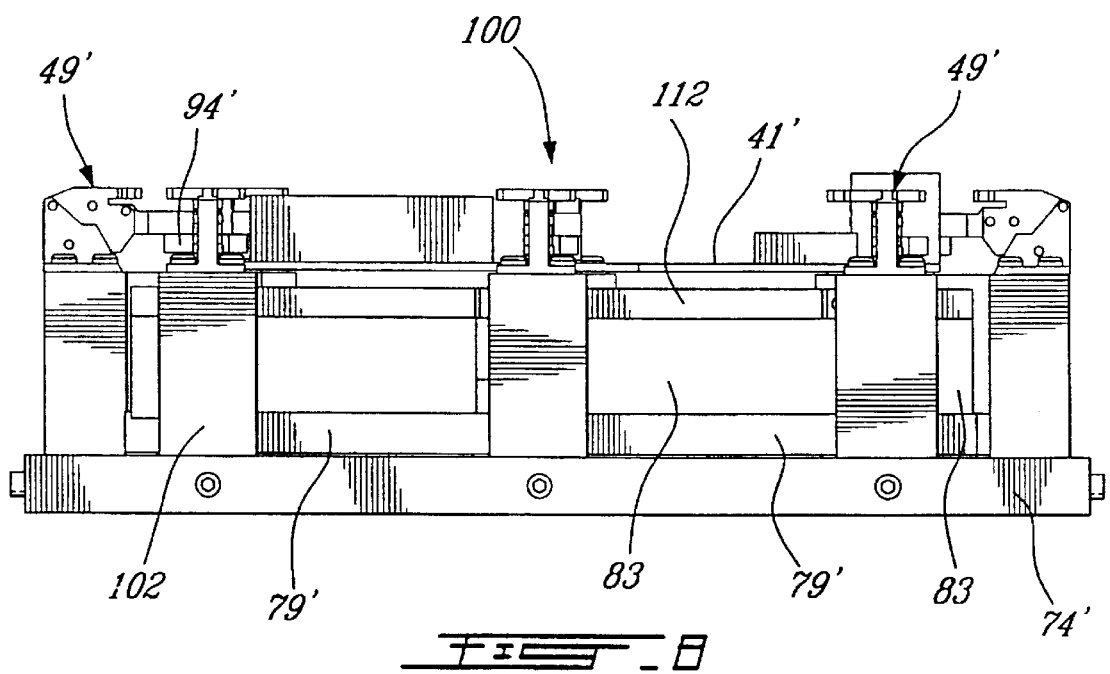

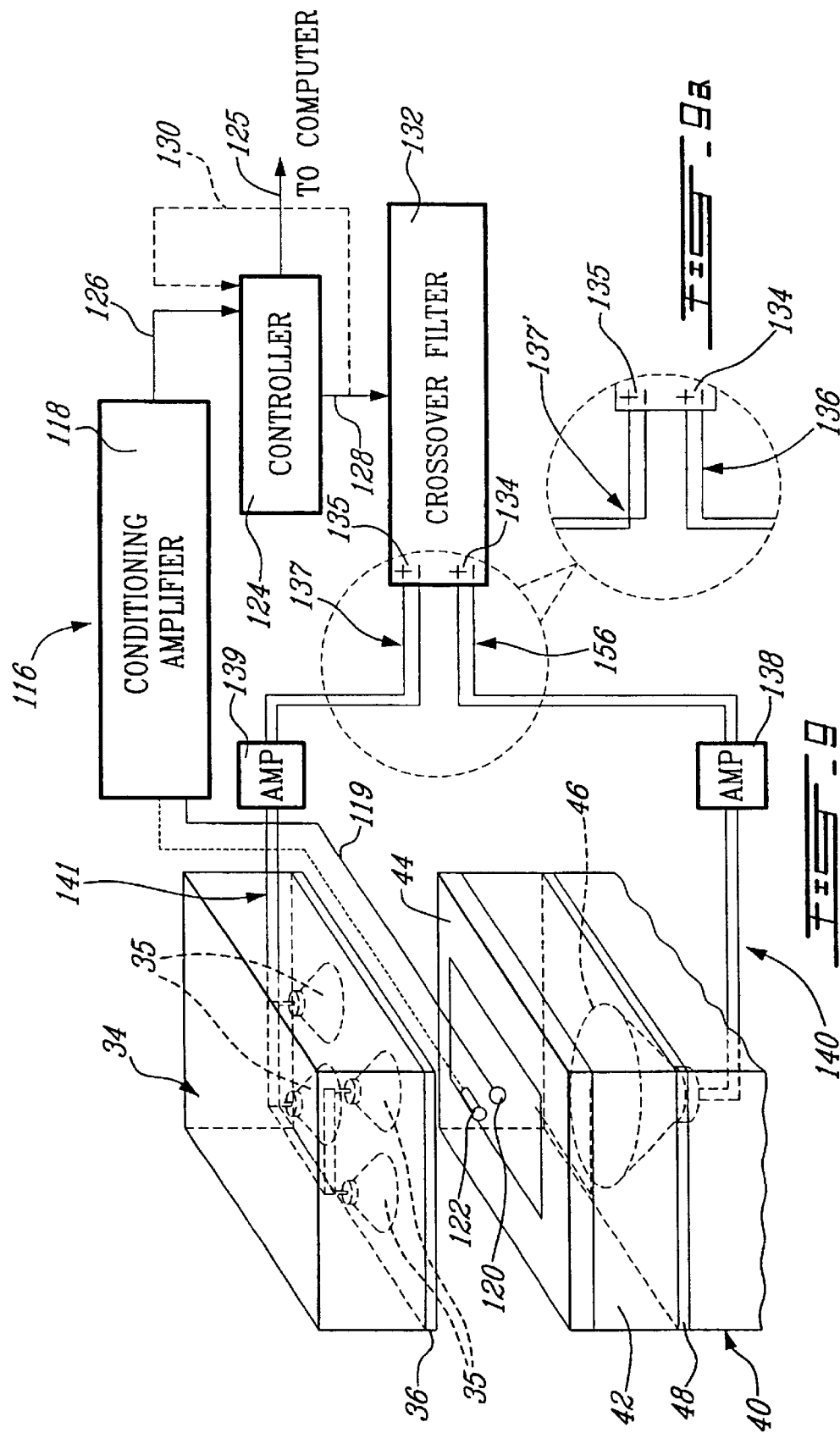

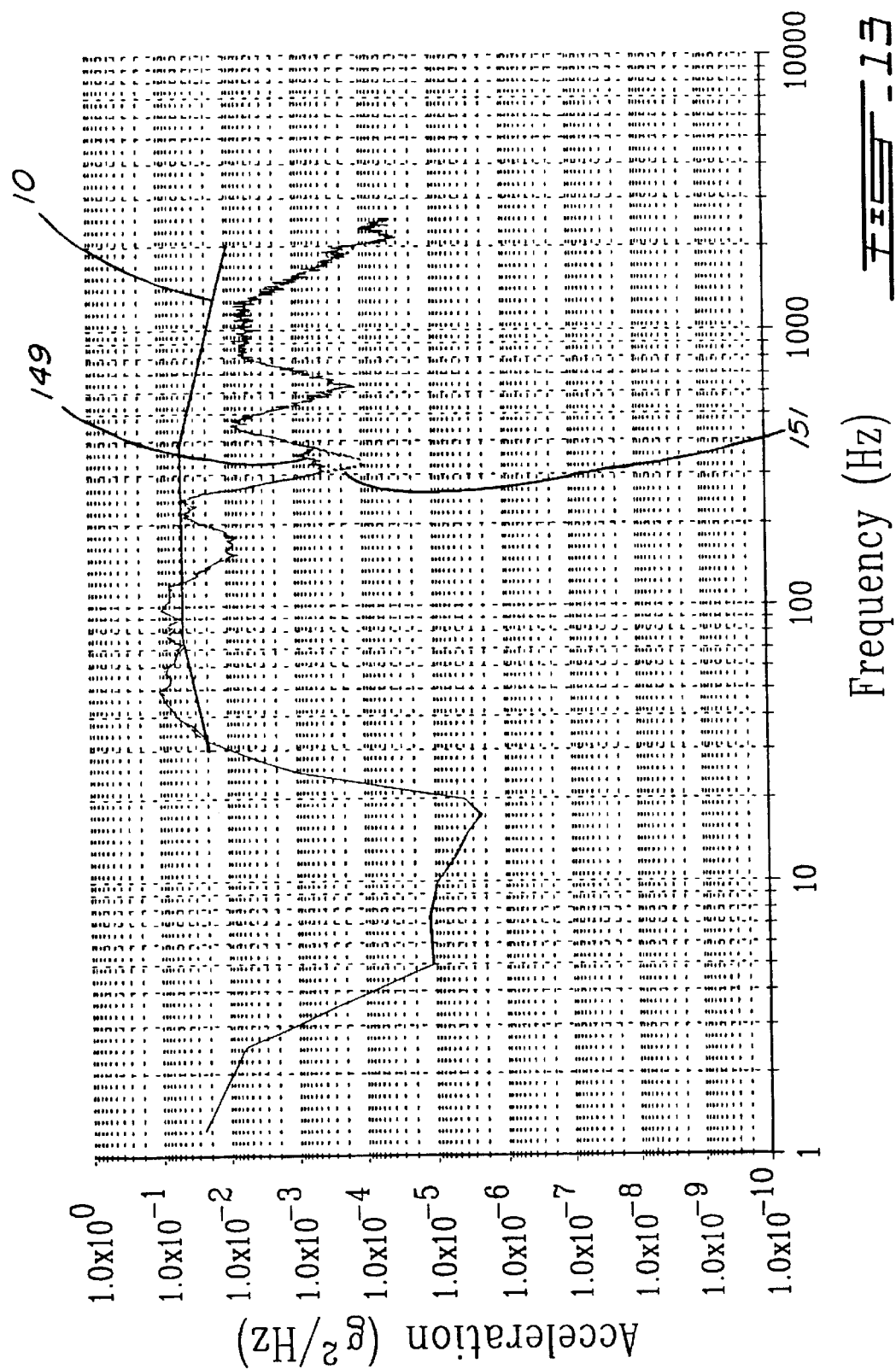

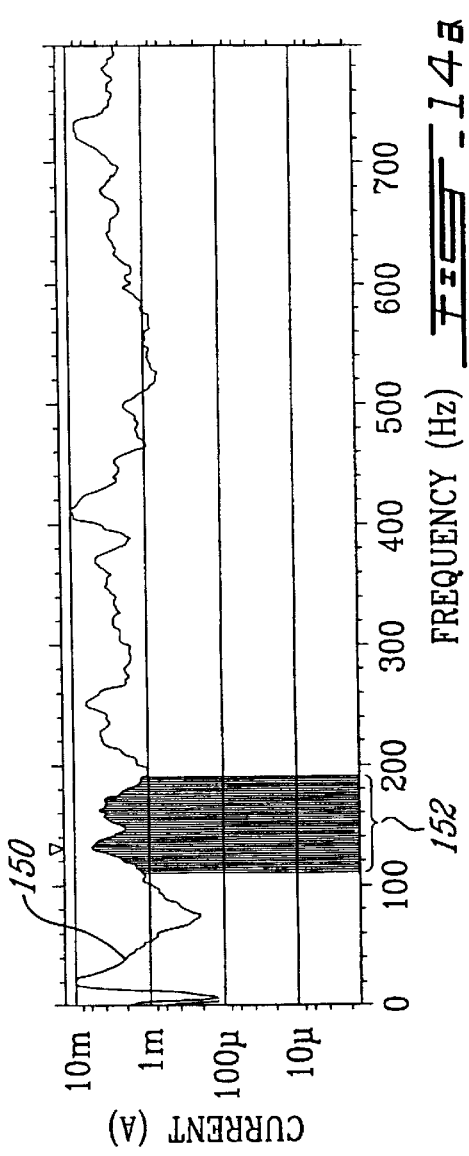
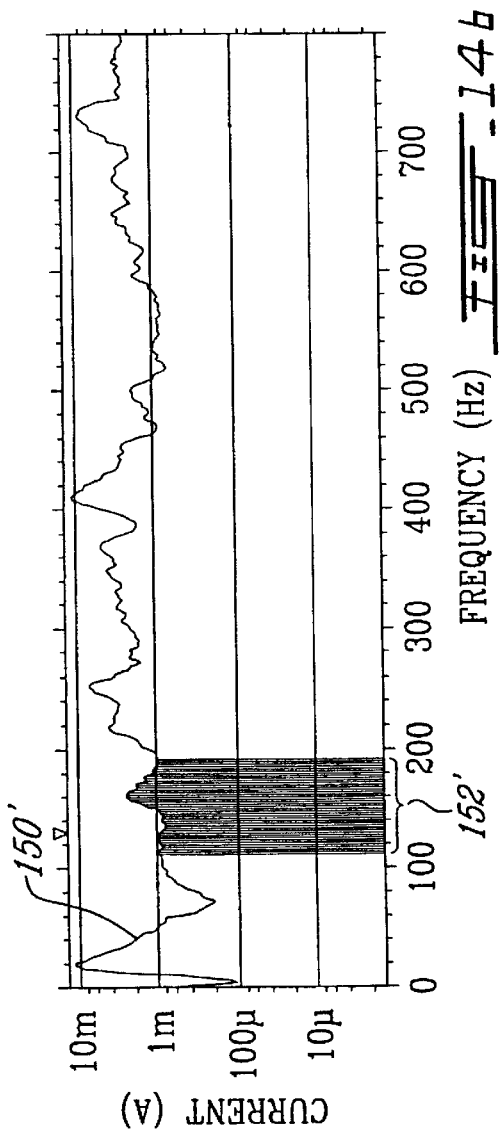

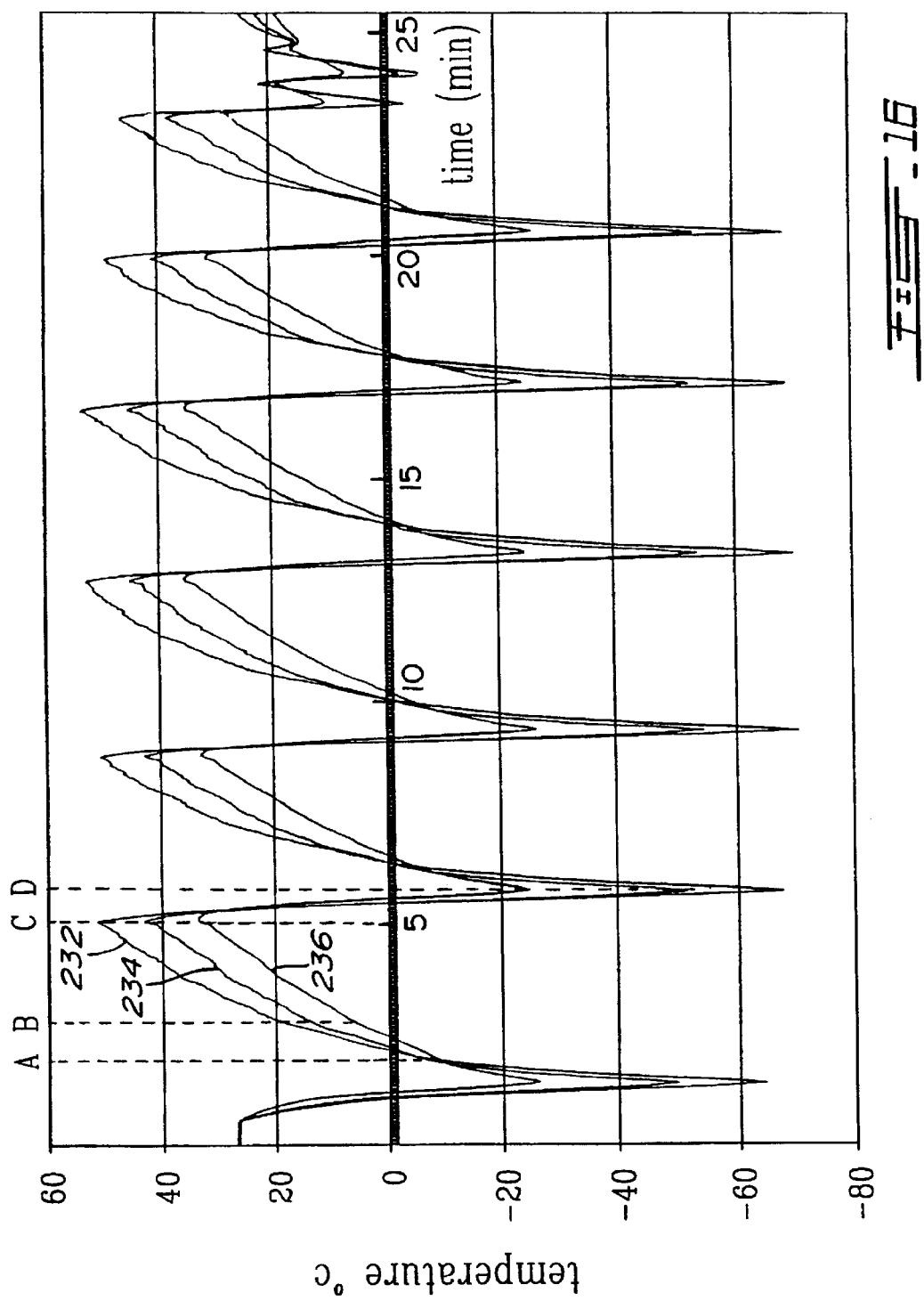

VIBRATION TESTING APPARATUS AND METHOD USING ACOUSTICAL WAVES

FIELD OF THE INVENTION

The present invention relates to vibration testing, and more particularly to a vibration testing apparatus and method using generation of acoustical waves as a means for imparting vibration to an article under test.

BACKGROUND OF INVENTION

Many types of testing equipment have been developed over the past years to subject articles to vibration for the purpose of assessing their reliability, generally according to industry standards considering the ultimate conditions of use of the specific articles to be tested. In the past years, military, aerospace and other electronic technology-related industries have developed methods, guidelines and standards involving a stimulation technique known as Environmental Stress Screening (ESS) which aims at precipitating latent defects before the delivery of electronic and/or electromechanical products, which defects would otherwise be likely to reveal only where the products are in the field, thereby causing unpredictable product failures, generally at an early stage of the product life. ESS involves performing series of testing steps integrated into the manufacturing process of a product, which steps consist of subjecting the product to predetermined stress levels, depending upon the manufacturing techniques used, in order to detect defects during the manufacturing process. Such defects normally cannot be detected by visual inspection or conventional qualification and/or reliability testing carried out at the end of the manufacturing process. Effectiveness of ESS is mainly due to the fact that the stress (amplitude and duration) required to reveal a latent defect is generally not sufficient to cause a damage that could adversely affect the life of a faultless product.

While improving quality and reliability of products which become therefore more competitive, ESS may significantly reduce production, maintenance and return costs caused by product failures. While in the early years of ESS, testing procedures were limited to static thermal cycles and sinusoidal vibration cycles, testing procedures have been thereafter improved to include dynamic thermal cycles and random vibration cycles. ESS applications for the U.S. navy have been documented in the <<Navy Manufacturing Screening Program >> NAVMAT-9492,1979, and thereafter, U.S. army has been using ESS to ensure a very high reliability as required for critical and complex electronic systems, and military standards such as <<Environmental Stress Screening Process for Electronic Equipment) >> MIL-HDBK-2164A have been developed. More recently, ESS testing has spread to many fields of the civil industry to improve the quality of electronic and electromechanical commercial products while reducing manufacturing costs. ESS guidelines for testing those commercial products have been published, such as <<Environmental Stress Screening Guidelines for Assemblies >>, Institute of Environmental Sciences, March 1990, and <<Product Reliability Division Recommended Practice 001.1, Management and Technical Guidelines for the ESS Process >> Institute of Environmental Sciences and Technology, January 1999. According to NAVMAT-9492 and as shown by the Power Spectral Density (PSD) reference curve 10 of FIG. 1, ESS vibration testing equipment must produce vibrations within the 20 to 2000 Hz frequency range during about 10 minutes, with a nominal vibration (acceleration) level of near 0.04 $g^2/Hz$, which corresponds to an effective level of 6 grms as obtained by integrating the NAVMAT PSD reference curve. The NAVMAT-9492 guidelines, which were not published as an actual standard, cannot be considered as being appropriate to every products. Indeed, for certain types of electronic products, its use may be adversely damaging. In other cases, stress levels higher than the NAVMAT-9492 guidelines should be used, as for the recent ESS 2000 Project according to which the use of a nominal vibration (acceleration) level up to 20 grms is contemplated. Since each electronic circuit is provided with specific dynamic characteristics, the vibrating response of the circuit not only depends on the nature of the excitation, but also on the specific dynamic characteristics.

For the purpose of performing ESS vibrating stimulation, an electrodynamic vibration table is generally used since it provides adequate control over the vibration parameters to comply with ESS specifications. However, the high cost of such equipment may significantly reduce the economical benefit obtained from ESS when the volume of production is not sufficient, limiting the use of electrodynamic vibration tables for ESS testing to large manufacturing facilities. While other technological solutions or less expensive vibrating equipment is available, such as hydraulic or pneumatic vibration tables, those vibrators are generally not suitable for producing ESS stimulation. The use of hydraulic vibrators being limited to low vibration frequencies, the upper portion of the frequency spectrum of a typical ESS power density profile cannot be handled. While pneumatic vibrators can handle higher vibration frequencies, they generally cannot allow accurate control over the excitation signal which is required by ESS to provide a stimulation profile adapted to a specific product, as discussed in "Improper Environmental Stress Screening Can Damage Your Product", Howe E., Test Engineering & Management, October/November 1998, pp. 22–23, and in "Improper Environmental Stress Screening Can Damage Your Product—Part II", Howe E., Test Engineering & Management, December/January 1998–99, pp. 14–16. In some cases, variation of the amplitude level may reach more than 30 dB.

Over the past years, acoustic test chambers have been developed to carry out various acoustical vibration tests, in which an article to be tested, such as an aircraft part, is subjected to a high sound pressure level which imparts vibration thereto. Such prior art chambers are disclosed in U.S. Pat. No. 3,104,543, U.S. Pat. No. 3,198,007, U.S. Pat. No. 3,827,288 and U.S. Pat. No. 4,574,632. More recently, in U.S. Pat. No. 5,226,326 issued to Polen et al., it was proposed to use a vibration chamber provided with a pair of speakers characterized by a same frequency operating range and arranged in a push-pull configuration to impart multiple modes of random vibration on a article under test according to a ESS vibration profile that is characterized by an enhanced power density level as compared with the profile obtained from a conventional in-phase arrangement of speakers. The acoustical waves providing direct vibrating stimulation to the product, the acoustic chamber does not require the use of custom mechanical fixtures which are specific to each product to be tested, so that universal-type fixtures can be generally used. While being less expensive than electrodynamic equipment, such a prior art acoustic test chamber may not provide the accurate control over a specific portion of the frequency spectrum which is required for testing particular products, since the proposed puss-pull configuration of identical speakers provides an overall increase of power spectral density essentially over the whole frequency range of the profile. Accurate control is particularly important within the lower frequency range of the profile where optimal stimulation of the main vibration modes is critical, as shown by the typical experimental Power Spectral Density curve designated at numeral 12 in FIG. 1, where a prior art acoustical testing chamber was used to test a plain printed circuit board without components mounted thereon, with white noise excitation signal characterized by a with a 500 Hz crossover frequency. It can be seen from FIG. 1 that the frequency response in the lower part of the operating bandwidth is significantly lower than PSD reference curve 10 guideline, indicating that the level of stress effectively applied to the article under test is insufficient. Although a nominal vibration (acceleration) level of about 14.5 grms can be estimated, which is well beyond the NAVMAT guidelines, integration of negative and positive variations exhibited by experimental curve 12 as compared to reference curve 10 allows an estimation of total negative and positive variations of about respectively 4.3 grms and 13.9 grms, which positive variation is essentially associated with the upper portion of the frequency range over about 1000 Hz. Although the positive variation could be better controlled by varying the amplitude characteristic of the excitation signal at high frequency to attenuate the positive variation at a desired level, experiences have shown that in the low frequency range, there is a limit in the excitation signal amplitude over which the negative variation cannot be significantly further reduced, thereby limiting the reliability and effectiveness of the ESS technique.

Accurate control is also important in the area of the crossover frequency when a crossover device is used to drive speakers having different operating ranges. In the latter case, accurate control of the power spectral density profile in the area of the crossover frequency should be obtained neither at the expense of power spectral efficiency, nor to adversely increase the overall acoustic level in the testing chamber so as to contribute to a more comfortable working environment.

SUMMARY OF THE INVENTION

It is therefore an object of the present invention to provide a testing apparatus and method for imparting vibration to an article under test, which provide improved control over the power spectral density profile of the imparted vibration.

It is a further object of the present invention to provide a testing apparatus and method for imparting vibration to an article, which can be used for the purpose of Environmental Stress Screening procedures.

It is a still further object of the present invention to provide a testing apparatus and method for imparting vibration to an article, which can be simultaneously subjected to thermal cycling.

According to the above objects, from a further broad aspect of the present invention, there is provided a vibration testing apparatus comprising a main enclosure defining a main acoustical cavity and having a baffle provided with at least one main opening, and an acoustical source having at least one acoustical transducer being acoustically coupled to the main acoustical cavity to generate low frequency acoustical waves toward the opening. The apparatus is capable of receiving an article to be tested in a position where the main opening is substantially closed by the article to expose a surface thereof to said acoustical wave while attenuating-portion of the acoustical waves reaching a substantially opposed surface of said article which is not directly exposed to the acoustical waves. Conveniently, the vibration testing apparatus further comprises acoustical insulation means adapted to receive the article an attachment means for securing the article in testing position, wherein the main opening is further closed by the acoustical insulation means.

According to another aspect of the invention, the vibration testing apparatus further comprises a thermally insulated enclosure defining a thermal cavity within which the article is contained; means for generating a flow of inert gas; means for heating said flow of inert gas; means for cooling said flow of inert gas; means for circulating said flow of inert gas into said thermal cavity; first sensor means located within said thermal cavity for producing a first temperature indicative signal; controller means responsive to said temperature indicative signal and operatively coupled to said heating means and said cooling means for controlling the temperature of one of said inert gas and said article by selectively activating one of said heating means and said cooling means according to a predetermined thermal cycling profile while said acoustical source generates said acoustical waves toward the exposed surface of said article.

From a still further broad aspect of the present invention, there is provided a vibration testing method comprising the steps of: a) providing a main enclosure defining a main acoustical cavity and having a baffle provided with at least one main opening; b) generating acoustical waves within a low frequency spectrum toward the opening; c) disposing at least one article to be tested in a position where the main opening is substantially closed by the article to expose a surface thereof to said acoustical waves of low frequency range while attenuating portion of the acoustical waves reaching a substantially opposed surface of the article which is not directly exposed to the low frequency acoustical waves. Conveniently, the method further comprises a step of: d) generating acoustical waves within a frequency spectrum higher to said low frequency spectrum toward the opposed article surface, said low and higher frequency spectrums being complementary adjacent a crossover frequency and being substantially in opposed phase relationship in the area of the crossover frequency to further increase power efficiency in said frequency area.

BRIEF DESCRIPTION OF THE DRAWINGS

Preferred embodiments of the apparatus and method according to the present invention will now be described with reference to the accompanying drawings in which:

FIG. 5 is a partial perspective view of the testing unit of FIGS. 1 and 2, showing the baffle on which is mounted a fixture adapted to secure single printed circuit board to be tested;

FIG. 6 is a partial perspective view of the testing unit of FIGS. 4a and 4b, on which is mounted a pair of adjacent fixtures identical to the fixture shown in FIGS. 1 and 2, to allow simultaneous vibration testing of two printed circuit boards of similar dimensions;

FIG. 7 is an exploded view of the testing unit of FIGS. 4a and 4b, on which is mounted an alternate fixture adapted to secure a pair or superimposed printed circuit boards of similar dimensions to be tested simultaneously;

FIG. 8 is a left end view of the alternate fixture of FIG. 7 when assembled, which shows the pair of printed circuit boards being rigidly secured to the fixture;

FIG. 9 is a block diagram of the driving subsystem as part of the acoustical sources of the testing unit of FIG. 1 and according to the preferred embodiment;

FIG. 9a is a partial outlined view of the subsystem of FIG. 9, showing an alternate connecting configuration for driving the acoustical transducers;

FIG. 13 is a graph plotted on logarithmic scales showing the Power Spectral Density reference curve according to NAVMAT-9492 and an experimental frequency response curves obtained with a second example of excitation signal for the same printed circuit board as referred to in FIG. 12 employing an apparatus according to the present invention, which uses the first connecting configuration of FIG. 9;

FIG. 14a is a graph showing current values of the excitation input signal after crossover filtering with respect to frequency when the first configuration of FIG. 9 is used to generate a given frequency response profile, in which graph the region under the curve within the area of the crossover cutoff frequency has been darkened;

FIG. 14b is a graph showing current values of the excitation input signal after crossover filtering with respect to frequency when the alternate configuration of FIG. 9a is used to generate the same frequency response profile as referred to in FIG. 14a, in which graph the region under the curve within the area of the crossover cutoff frequency has also been darkened.

FIG. 16 is a graph showing typical cycling temperature response curves with respect to time as obtained with the thermal control subsystem of FIG. 15 using various sensor types and locations.

DETAILED DESCRIPTION OF THE PREFERRED EMBODIMENT

Figure 2:
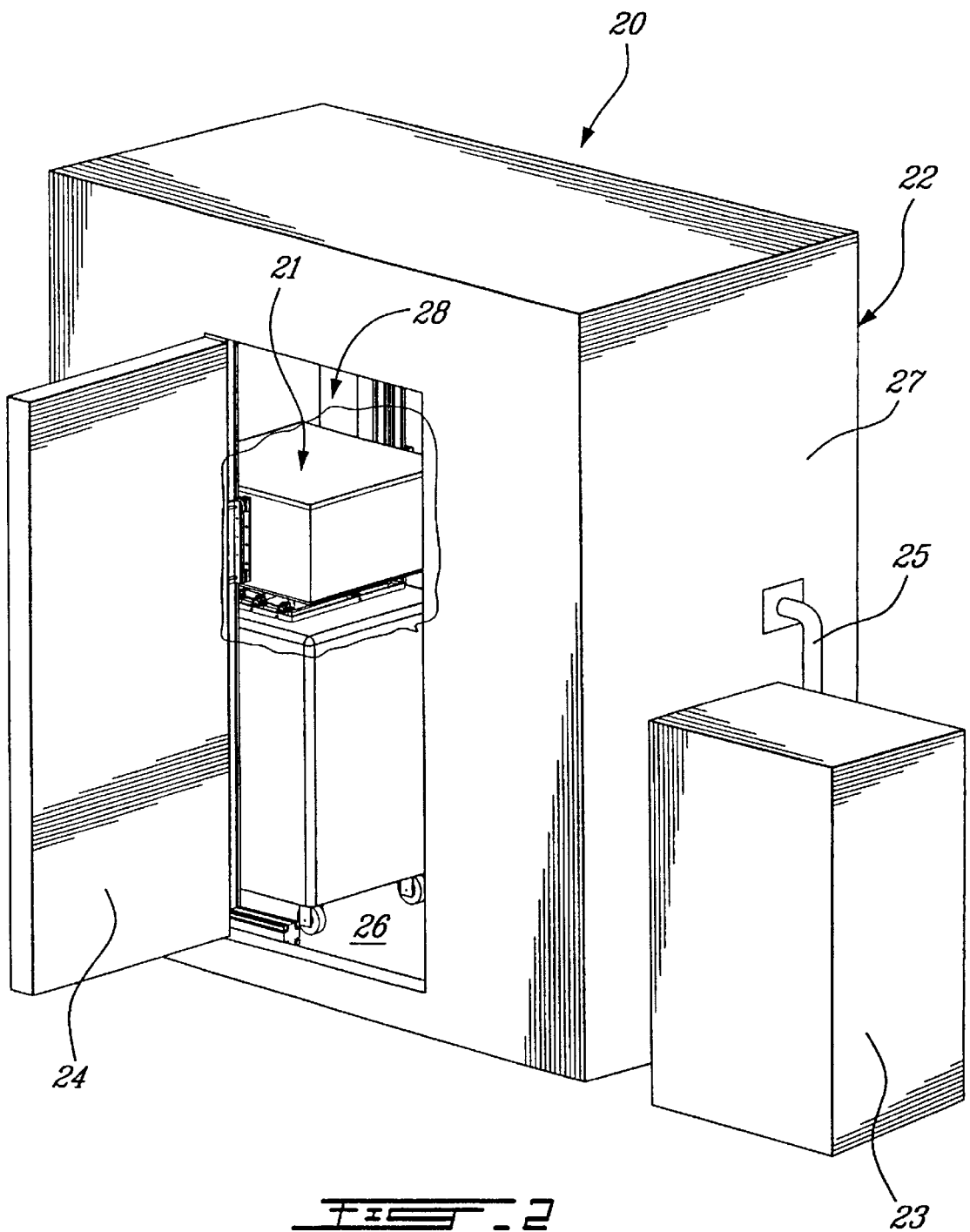
FIG. 2 is a perspective view of an acoustical insulation chamber containing a testing unit according to a preferred embodiment of the vibration testing apparatus according to the invention.
Figure 3:
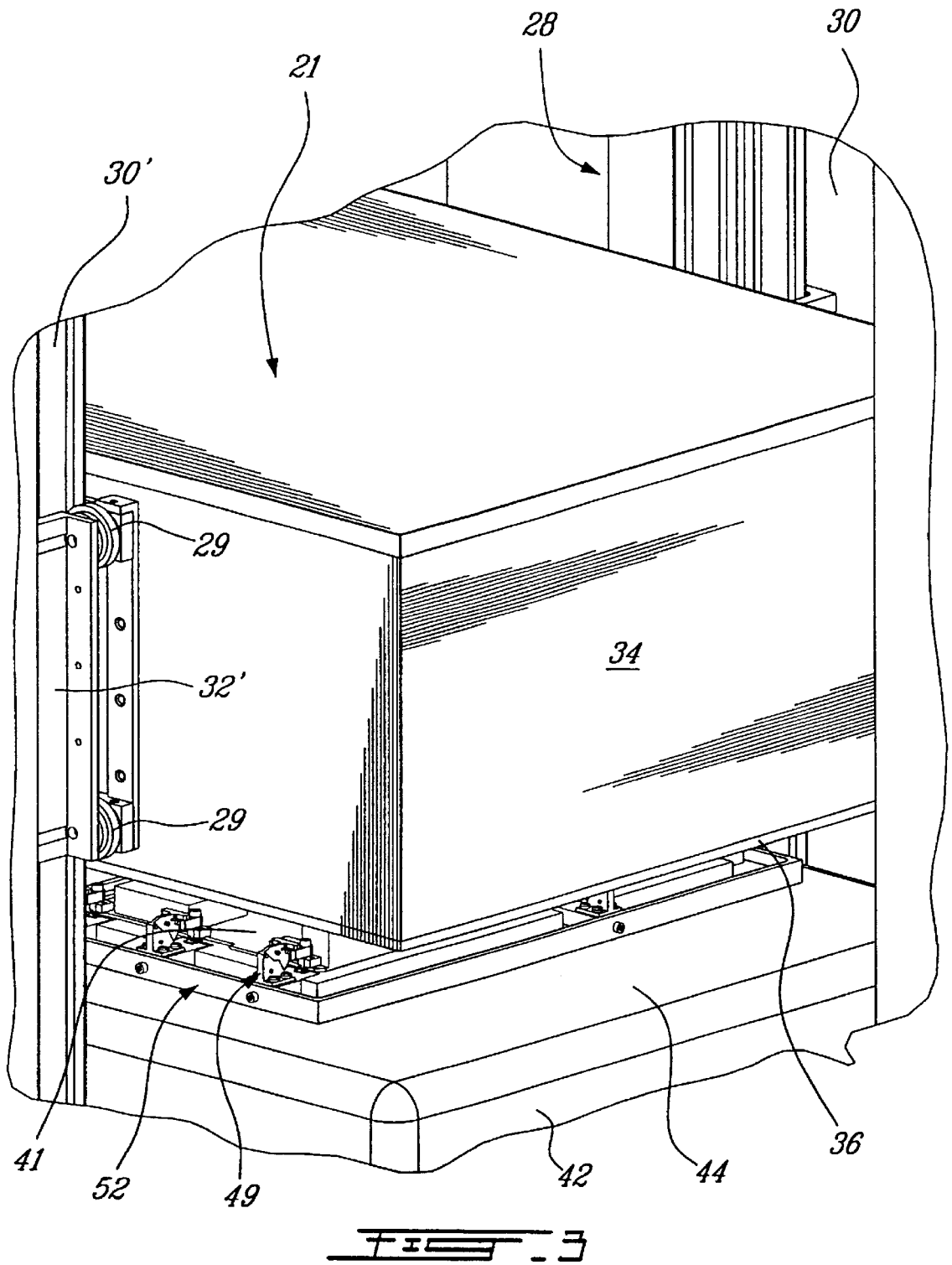
FIG. 3 is a perspective view of the outlined portion of the vibration testing apparatus of FIG. 2, showing the central portion of the testing unit in more detail.
Figure 4A:
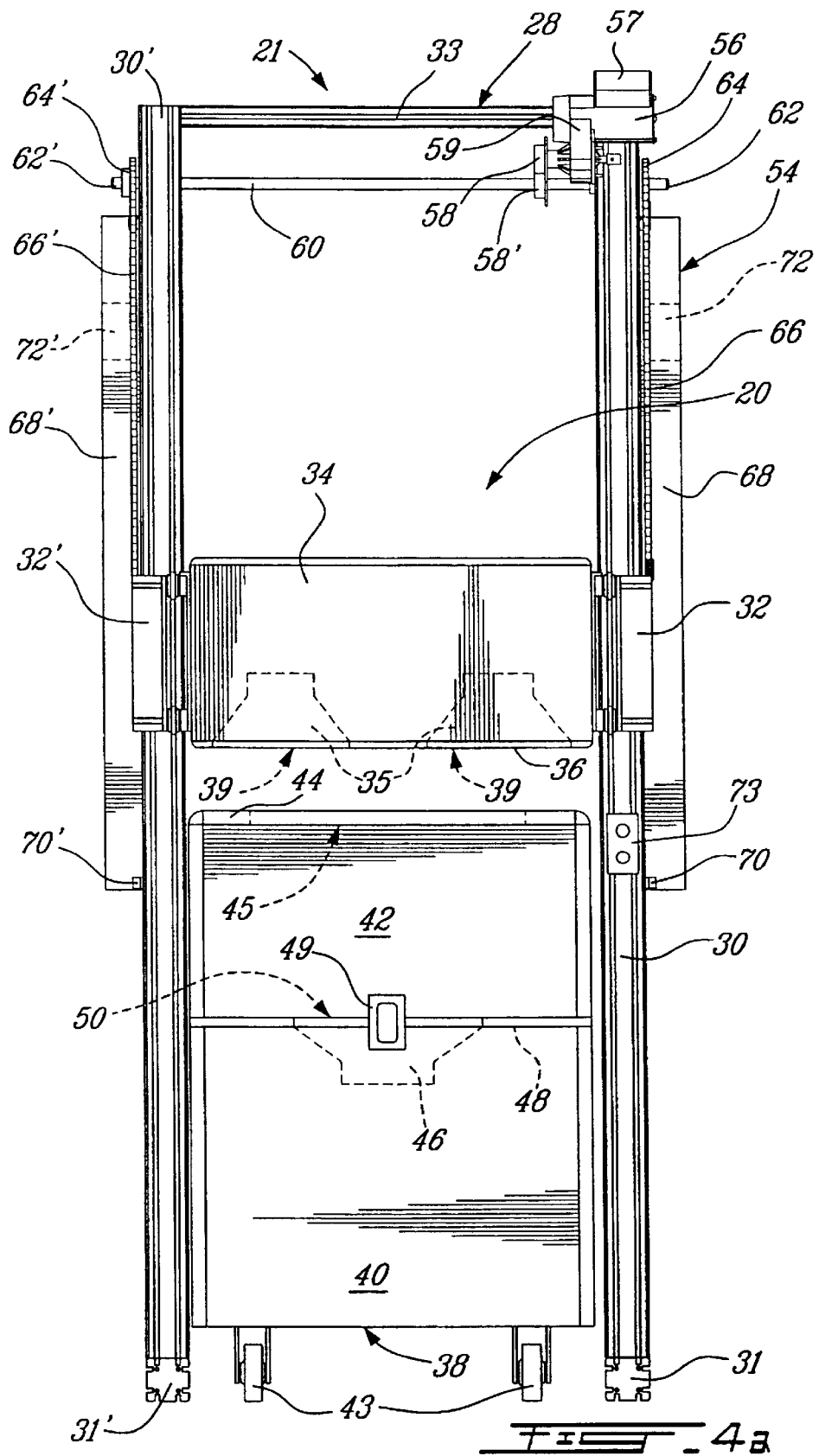
FIG. 4a is a complete end view of the testing unit of FIGS. 1 and 2, without the fixture.
Figure 4B:
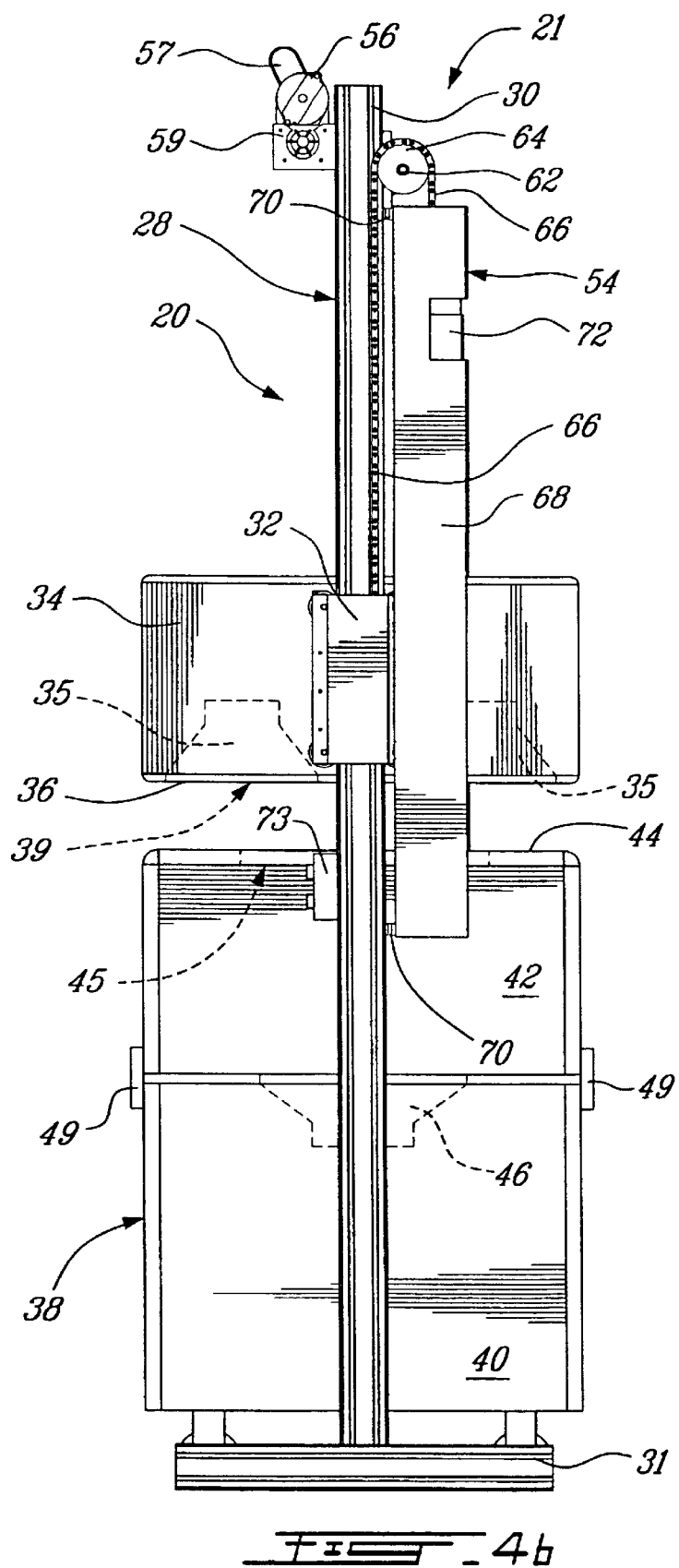
FIG. 4b is a complete rear view of the testing unit of FIGS. 1 and 2, without the fixture.

Referring now to FIG. 2, the vibration testing apparatus according to the preferred embodiment of the present invention and generally designated at numeral 20 comprises a testing unit generally designated at 21 which is included within an acoustical insulation chamber 22 of a known type, such as supplied by Mecart, (Quebec, Canada), which is provided with an access door 24. The apparatus 20 further comprises a driving subsystem enclosed within an electrical cabinet 23, which subsystem will be described later in detail. The driving subsystem is connected to the electrical inputs and outputs of the testing unit through a bundle of electrical cables 25 passing through a side wall 27 of the chamber 22. Standing on the floor 26 of the chamber 22 is a gantry type lifting holder 28 as better shown in FIG. 3, which comprises a pair or parallel and vertical supporting rails 30, 30' along which a pair of carriages 32, 32' are made displaceable with rollers 29. Turning now to FIGS. 4a and 4b, the holder 28 further comprises a pair of foot members 31, 31' each connected to a lower end of respective rails 30, 30', which are interconnected at their upper ends with a transverse member 33 as shown in FIG. 4a. Secured to the carriers 32, 32' and disposed between the rails 30, 30' is an upper transducer such as loudspeaker module 34 having four 15 inch/1000 W high capacity loudspeakers 35 being innerly mounted on a bottom plate 36 having corresponding openings 39. While four loudspeakers 35 are preferably used to obtain an input impedance which optimize power efficiency, a reduced number of loudspeakers may also be used. The testing unit 20 also comprises a main enclosure 38 including a main acoustical transducer in the form of a main loudspeaker module 40 mounted on wheels 43, and a cover portion 42 being mounted on the module 40 by clamps 49 and having a top wall forming a baffle 44 provided with a main opening 45. The main loudspeaker module 40 forms with its corresponding driving circuit a main acoustical source, as will be explained later in more detail with reference to FIG. 9. The baffle used was made from a ⅝ inch veneer board for providing sufficient stiffness. Since dimensions of the main opening 45 will depend from dimensions of the article to be tested, the cover portion 42 is designed to allow baffle replacement. A 21 inch/1000 W high capacity loudspeaker 46 is innerly mounted on a top plate 48 provided with a corresponding aperture 50 and as part of the main loudspeaker module 40, so as to be acoustically coupled to a main acoustical cavity defined by the cover portion 42 with baffle 44 and the top plate 48. It is to be understood that more than one loudspeaker can be mounted if required by the dimensions and weight of the article to be tested. According to the present invention, the baffle 44, in attenuating the acoustical waves reaching the article surface which is not directly exposed to the acoustical waves produced by the main loudspeaker module 40, attenuates the opposed phase acoustical annihilation occurring at the unexposed side of the baffle 44, thus significantly improving the frequency response control within the low frequency range of the excitation profile where optimal stimulation of the main vibration modes is critical, as explained before with reference to the NAVMAT 9492 guidelines used for ESS testing.

Therefore, baffle 44 is part of the main enclosure 38 within which is mounted the acoustical transducer having the lower operation frequency bandwidth, namely loudspeaker 46 in the instant example. The use of baffle 44 contributes to maintain the overall acoustic level in the testing chamber at a level which can be sufficiently attenuated by the acoustical insulation walls of the chamber so as to provide a safe working environment. Experiences have shown that the use of a baffle associated with loudspeakers 35 which have a higher operation frequency bandwidth is not required to generate a sufficient sound pressure level at those frequencies.

Returning to FIG. 3, disposed on baffle 44 and rigidly secured thereto is an attachment means in the form of a fixture 52 adapted to receive and rigidly maintain at its edge a printed circuit board 41 to be tested on the baffle 44, in a position where the main opening 45 shown in FIGS. 4a and 4b is substantially closed by the printed circuit board 41. It is to be understood that the fixture 52 could be readily modified to receive any other article to be subjected to vibrations and presenting similar or smaller dimensions. Referring again to FIGS. 4a and 4b, the holder 28 is further provided with a lift 54 including an electric motor 56 having a controller 57 and being coupled to a reduction gear box 59 having an output shaft being laterally connected through cooperating gears 58 and 58' to a driven shaft 60 having opposed ends 62, 62' transversely extending through corresponding bores provided on respective upper portions of rails 30, 30'. Mounted on shaft ends 62, 62' are first and second chain gears 64, 64' cooperating with driving chains 66, 66' each having a first end rigidly attached to an upper portion of carriages 32, 32' and a second end attached to counterweights 72, 72' extending through first and second guide cylinders 68, 68' which are attached to rails 30, 30' with upper and lower support members 70 and 70'. Up and down displacement of the upper loudspeaker module 34 is activated via a control unit 73. A flexible screen or curtain (not shown) made of an acoustical insulation material or fabric may be attached at an upper edge thereof to the loudspeaker module 34 to provide further directional confinement of the acoustical waves toward the article to be tested.

Turning now to FIG. 5, the fixture 52, which is designed to receive a single printed circuit board (PCB) 41, comprises a generally rectangular outer frame 74 provided with a recessed planar portion 76 defining a central opening aligned with the main opening 45 and being rigidly secured to the baffle 44 with proper fasteners such as screws (not shown). Disposed on the planar portion 76 in a generally rectangular configuration are a set of acoustical insulation seals 79 forming a generally closed perimeter bounding the periphery of PCB 41', thereby blocking the elongate opening formed between PCB 41 and the planar portion 76 of the frame 74. The seals 79 may be made of any material having appropriate acoustical insulation characteristics such as closed-cell polyurethane foam of sufficient density. The seals 79 are fixedly applied onto the planar portion 76 with a proper adhesive. Also mounted on the planar portion 76 and separated by the seals 79 is a set of adjustable clamps 49 having mounting blocks 81 that can be locked in a predetermined position along the corresponding sides of the frame 74 by set screws 82 extending through corresponding bores (not shown) provided on the sides of the frame 74, and through corresponding threaded bores (not shown) provided on the blocks 81. Alternatively, the sides of frame 74 may be provided with elongated slot to allow position adjustment for the blocks 81. Each clamp 49 includes a spring biased clamping member 86 cooperating through pivot 87 with a base member 88 having a pair of lateral flanges 90 being rigidly secured to the corresponding block 81 with screws 92. To the forward end of each clamping member 86 is secured a mounting spacer 94 secured in a position parallel to a corresponding PCB edge with a set screw 96 vertically extending through the forward end of clamping member 86. Each mounting block 81 is provided with a rib (not shown) having an end that is vertically aligned with the mounting spacer 94 when the clamp is in a lock position, defining a tight space for receiving and maintaining the PCB edge adjacent portion. Facing ends of mounting spacers 94 and corresponding ribs are aligned with rubber pads 95 to ensure that the PCB edge surface is not being damaged by the clamps 49 when the latter are brought in a lock position, while ensuring acoustic insulation at the point of contact of the PCB. The fixture 52 is designed to allow the mounting of a sufficient number of clamps 49 located on the periphery of the PCB according to its main vibration modes and to the location of the mounted components 85, to provide an effective conversion of acoustic energy to vibrations imparted to the PCB, as will be explained later in more detail.

Figure 1:
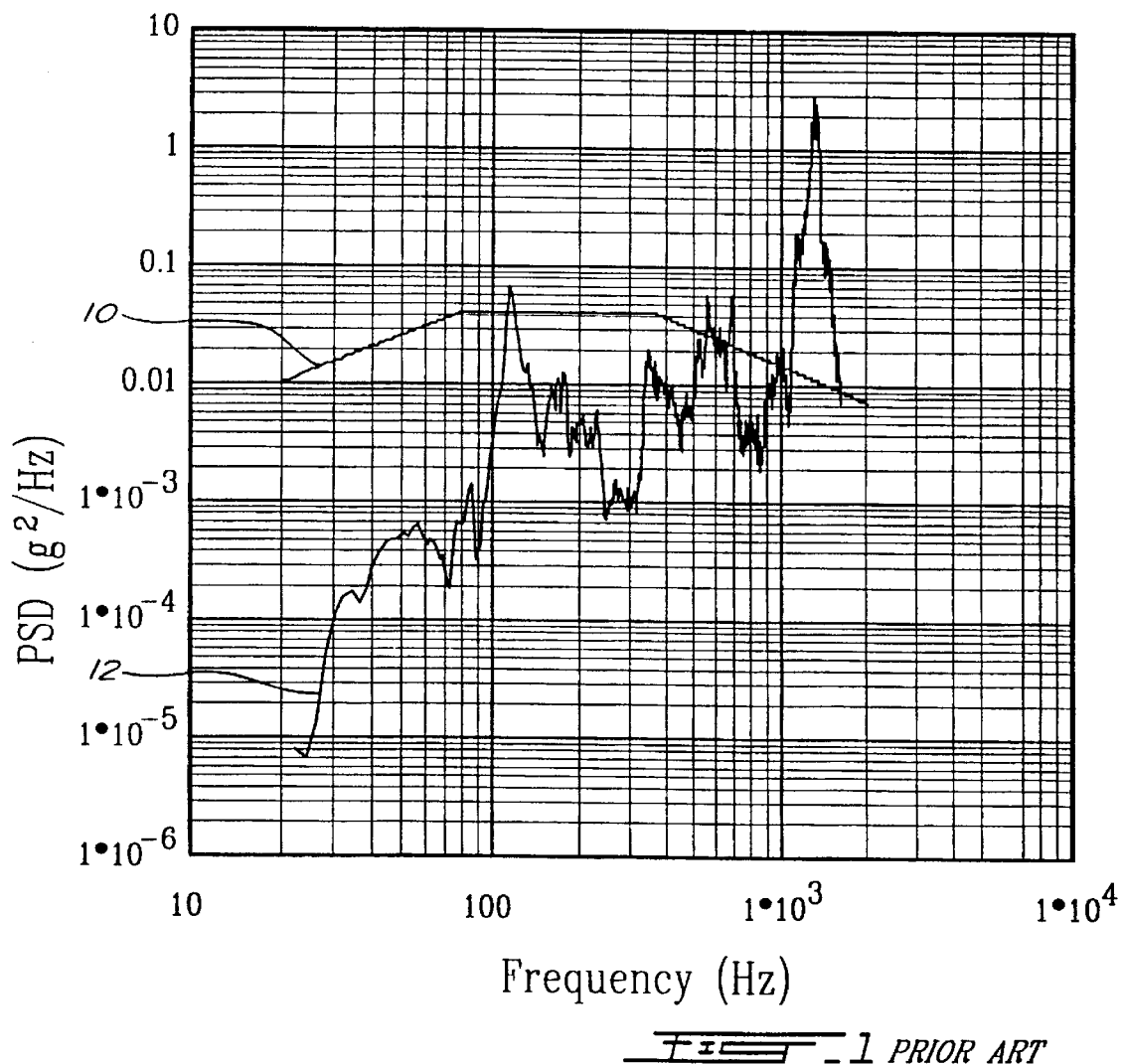
FIG. 1 is a graph plotted in logarithmic scales showing a Power Spectral Density reference curve according to NAVMAT-9492 with a typical experimental frequency response curve obtained for a printed circuit board without components, as tested with an acoustical chamber of the prior art.

Turning now to FIG. 6, there is shown a pair of adjacent fixtures 52 which are identical to the fixture shown in FIGS. 1 and 2, allowing the simultaneous vibration testing of two printed circuit board 41 and 41' of similar dimensions. For this configuration, the baffle 44' is provided with a main opening 45' which is roughly twice as large as the opening 45 shown in the baffle 44 of the testing unit depicted in FIGS. 1 and 2. Furthermore, in order to ensure acoustical insulation at the spacing formed by adjacent lateral edges of the frames 74 to provide sufficient clearance for the set screws retaining the inner clamps 49, an acoustical insulation seal 99 which is similar to seals 79 is tightly inserted within the spacing with proper adhesive. The seal 99 may also be formed by two identical thinner seals fixed to respective lateral edges of the frame 74 with proper adhesive.

Referring now to FIGS. 7 and 8, there is shown an alternate attachment means in the form of a fixture generally designated at 100 adapted to secure a pair or superimposed printed circuit boards 41 and 41' to be tested simultaneously. The alternate fixture 100 is of a same basic modular construction as compared to the fixture 52 shown in FIG. 5, with additional elements enabling the fixture 100 to receive two printed circuit boards 41 and 41' in a vertically spaced relationship. The additional elements include a set of fixed spacer blocks 102 secured onto mounting blocks 81' with screws (not shown) passing through corresponding threaded holes 104. The additional elements further include a corresponding set of removable spacer blocks 108 each being provided with an elongated rib 109 that is designed to cooperate with a corresponding elongated recess provided on the inner side of each fixed spacer block 102. The additional elements also include a second generally rectangular frame 112 having peripheral edge portions adapted to engage with corresponding transverse recesses 110 provided on the removable spacer blocks 108 for securing thereof as a modular assembly. The end of the rib 98 provided on each mounting block 81' is vertically aligned with a mounting portion 111 of the rib 109 with a corresponding pair of rubber pads 95 when the clamp is in a lock position, defining a tight space for receiving and maintaining the adjacent portion of the edge of PCB 41 ensuring acoustic insulation at the point of contact, while ensuring that the PCB edge surface is not being damaged by the clamps 49' when the latter are brought in a lock position. When the clamps 49' are in the lock position, the second PCB 41' is also rigidly maintained by the mounting spacers 94', rubber pads 95' and facing tabs 114 protruding from the corresponding removable spacer blocks 108. Disposed on the planar portion 76' of the frame 74' is a first acoustical insulation seal 77 made of a resilient acoustical insulating material and adapted to receive the first PCB 41 thereon. Also provided is a set of second acoustical insulation seals 79' adapted to be disposed on the upper surface of PCB 41' to form with first seal 77 a closed perimeter bounding the periphery of the PCB 41'. A set of rigid baffle walls 83 bearing on the second seals 79' and adapted to receive the second rectangular frame 112 is provided, which walls 83 are specifically dimensioned to tightly fit between spacer blocks 102, to form a secondary enclosure defining a secondary acoustical cavity between first and second PCBs 41 and 41'. When the PCB 41' Is disposed on the second frame 112, the opening thereof Is acoustically closed by the PCB 41', thereby attenuating the opposed phase acoustical annihilation occurring at the unexposed side of the PCB 41', while providing transfer of acoustical energy from the main cavity to the PCB 41', through the PCB 41 and the secondary cavity. It is to be understood that whenever testing of more than two printed circuit boards is desired, some combinations of fixtures as shown in FIGS. 5 to 7 may be used. For testing four PCB's, a pair of fixtures 100 may be likewise employed. Furthermore, the alternate fixture 100 of FIG. 7 could be obviously modified to allow clamping of three or more superimposed PCB's, provided acoustical attenuation between adjacent secondary cavities is kept within an acceptable limit.

Figure 10:
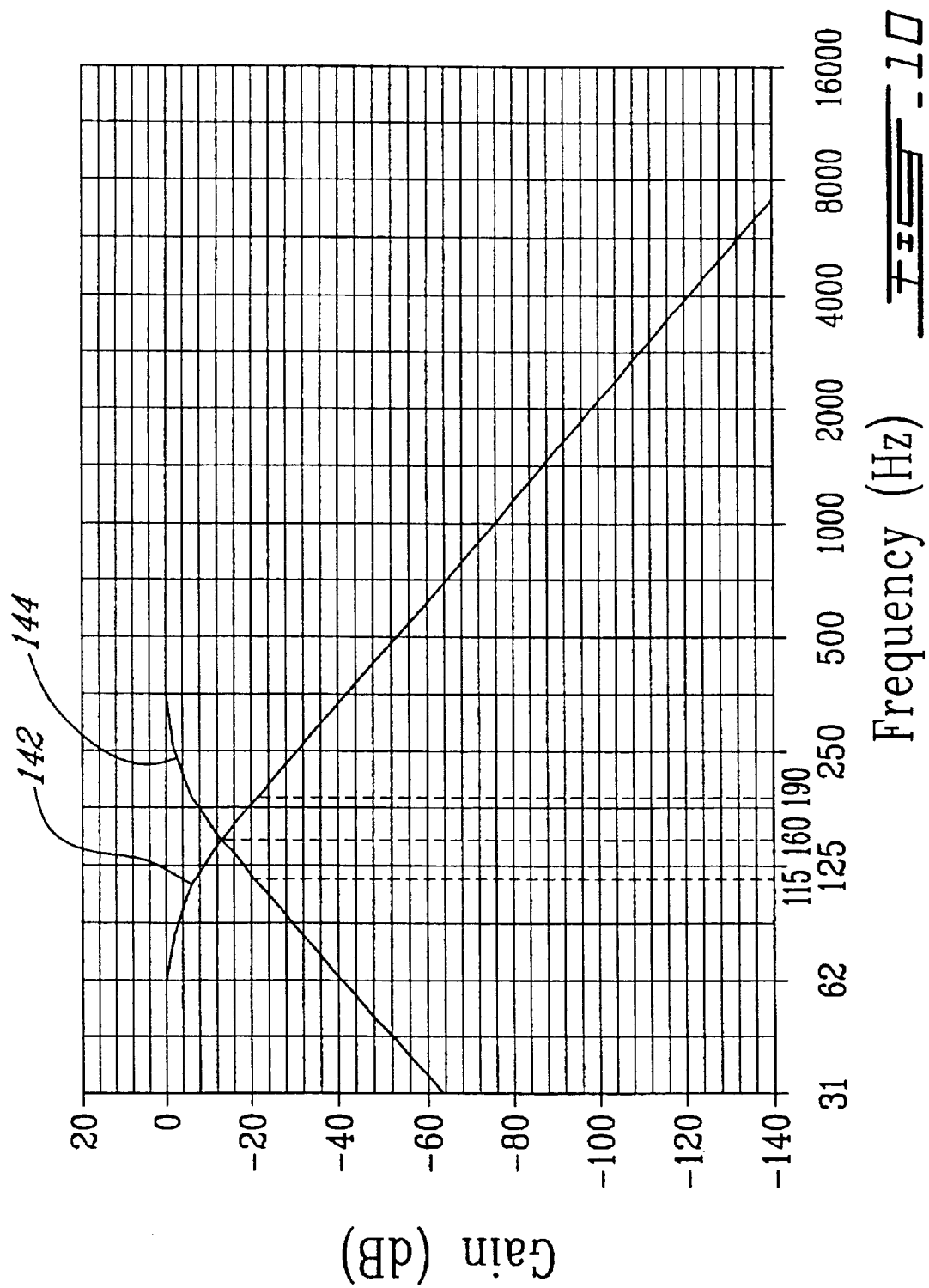
FIG. 10 is a graph showing typical frequency response curves according to the crossover setup used for the driving subsystem shown in FIG. 9.

Turning now to FIG. 9, a driving subsystem as part of the acoustical sources for the testing unit of FIG. 1 according to the preferred embodiment of the present invention will now be explained. The driving subsystem generally designated at 116 comprises a conditioning amplifier 118 such as manufactured by Nexus for receiving through input line 119 an input signal in the form of a vibration indicating signal generated by a vibration transducer such as accelerometer 120 which is adapted to be coupled to an article to be tested (not shown) secured on the baffle 44 as explained before. The accelerometer 120 is preferably located on a central area of an exposed surface of the article, though other locations may be appropriate, as well as the use of more than one accelerometer to derive a combined or average input signal. An accelerometer such as Endevco type 2222C may be employed. Alternatively, a microphone 122 located near the article may be used as the transducer for generating the input signal in the form of a sound pressure indicative signal. In this case, while a vibration transducer is still required for calibrating sound pressure measurements in dB with reference to corresponding vibration levels in g unit prior to carry out tests on each series of identical articles, the tests can be thereafter performed solely with the microphone mounted in a fixed position without any need to couple a vibration transducer onto each article to be tested. While a second microphone (not shown) may be mounted within the main acoustical cavity defined by the cover portion 42 and the top plate 48 of the main loudspeaker module 40, to generate an input signal specific to the loudspeaker 46, experiences have shown that the single microphone 122 which is directly exposed to the acoustic field generated by the loudspeakers 35 of upper module 34, also receives a sufficient level of indirect acoustic waves produced by the loudspeaker 46 to provide appropriate control thereof. The conditioning amplifier 118 performs impedance and amplitude matching to produce a control input signal which is fed to a UDC type vibration controller 124 through a line 126. The controller 124 compares the vibration indicating signal or the sound pressure indicating signal in feedback with reference excitation signal data being characterized by a known frequency content to generate an excitation input signal accordingly through line 128 . Alternatively, rather than implementing a continuous feedback configuration using the vibration or sound pressure transducer input signal to derive the input control signal, the output signal of the controller may be used as the input control signal through a direct feedback line 130, to perform the required comparison with the reference excitation signal data. Another approach would consists of using the controller 124 to directly generate the excitation input signal from the reference excitation signal data, provided acoustical and electrical characteristics of other components of the testing apparatus can be considered as being sufficiently stable. The controller 124 may be linked through an output line 125 to a computer (not shown) for data storing and analyzing purposes. The excitation input signal is fed to a crossover filter 132 of a known type such as manufactured by Active, the outputs 134 and 135 of which being connected via lines 136 and 137 to amplifier channels 138 and 139 of a power amplifier respectively to produce through output lines 140 and 141 respectively connected to loudspeaker 46 and loudspeakers 45 linked in parallel, first and second electrical output signals having respective complementary frequency spectrums adjacent a crossover cutoff frequency. The cutoff frequency of the filter is selected according to the respective frequency operating ranges of the loudspeakers 46 and 35, which are chosen to present complementary frequency operating ranges to maximize power efficiency of the apparatus. In the instant example, the 21 inch loudspeaker 46 was chosen to have an effective operating range from about 20 to 160 Hz, while each loudspeaker 35 was chosen to have a complementary effective operating range from about 160 to 2000 Hz. Hence, the selected cutoff frequency of the crossover filter was 160 Hz, as shown in FIG. 10, where there are depicted typical frequency response curves 142 and 144 according to the respective frequency operating ranges of the loudspeakers 46 and 35 shown in FIG. 9. It can be seen that the crossover output signal associated with the loudspeaker 46 contains the lower part of the frequency response under about 130 Hz, whereas the crossover output signal associated with loudspeakers 35 contains the upper part of the frequency response above about 130 Hz. It can be seen from curve 142 that some attenuation actually occurs in a range following a low-pass portion of the filter at 0 dB from about 62 Hz to 130 Hz at a rate of about 13 dB over that range. Similarly, It can also be seen from curve 144 that the attenuation decreases In a range from 130 Hz to about 375 Hz at a same rate of about 22 dB/octave which corresponds to a gain attenuation reduction of about 13 dB to reach a high-pass portion of the filter at 0 dB. Such frequency response in the area of the cutoff frequency which generally characterizes known crossover filters affects power efficiency in the area of the crossover frequency, and more specifically within a standard range defined by points on curves 142 and 144 corresponding to a 20 dB/octave gain decrease with reference to the 0 dB gain level. Turning now to FIG. 9a, a solution to prevent such power efficiency decrease in the area of the crossover cutoff frequency consists of implementing an alternate connecting configuration for driving the loudspeakers 46 and 35 shown in FIG. 9. It consists of coupling a single one of the outputs of the crossover filter 132, say the output 135 in the example shown in FIG. 9a, according to an inverted polarity to the corresponding acoustical transducer through inverted line 137', i.e. the loudspeakers 35 in the instant example, whereby the first and second electrical output signals fed to the loudspeakers 46 and 35 by amplifier channels 138 and 139 through lines 140 and 141 are substantially in an opposed phase relationship in the area of the crossover cutoff frequency. A switch (not shown) may be provided for selecting the desired polarity configuration.

Figure 15:
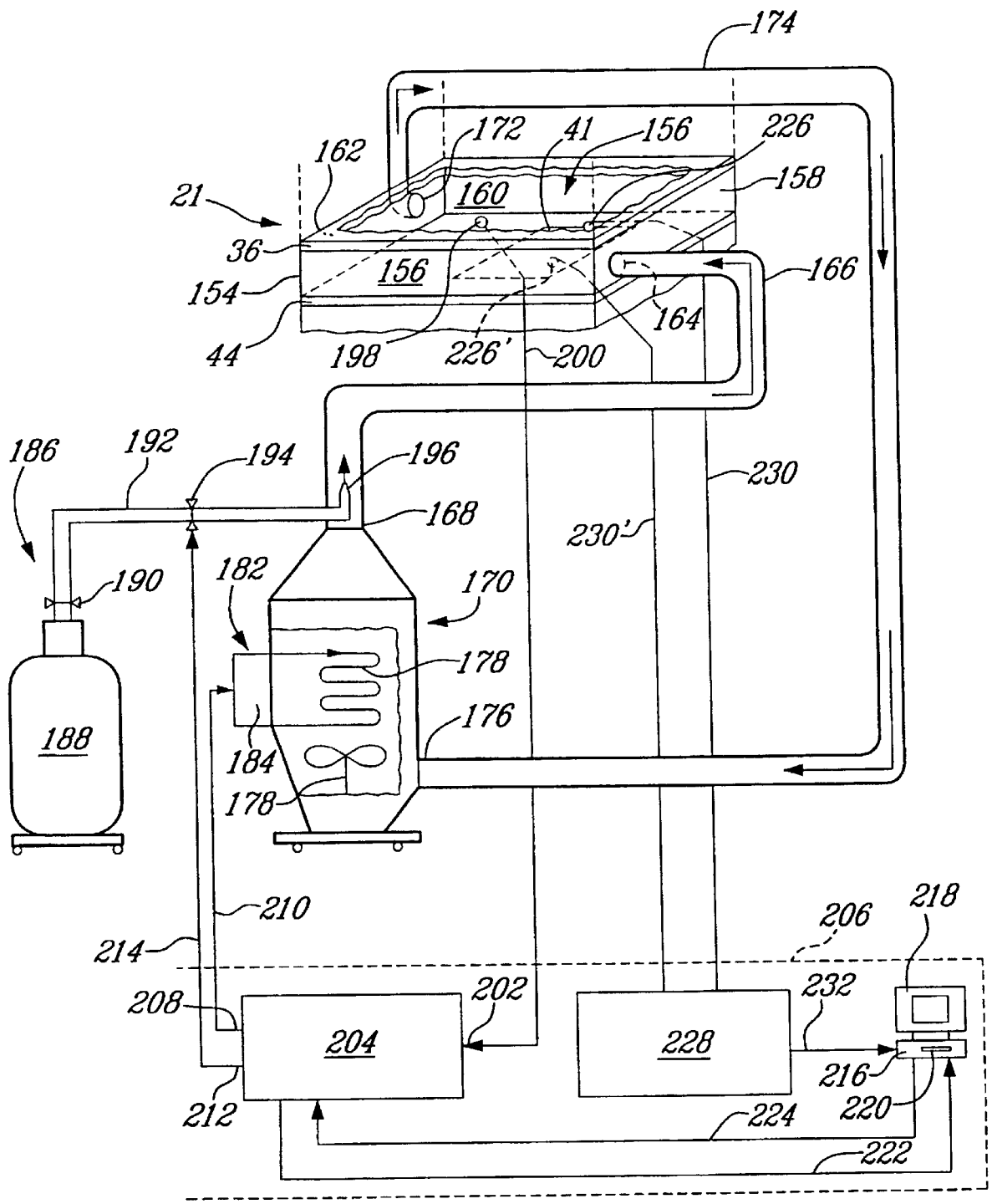
FIG. 15 is a general block diagram of a thermal control subsystem used in accordance with an alternate embodiment of the apparatus of the present invention, allowing thermal cycling stress screening simultaneously to vibration testing.

Referring to FIG. 15, an alternate embodiment of the apparatus of the present invention which allows thermal cycling simultaneously to vibration testing will be now described. This alternate embodiment comprises all of the components included in the first preferred embodiment as described hereinabove with reference to FIGS. 2 to 10, with an additional thermal control subsystem for allowing thermal testing such as thermal cyclic stress screening of articles under vibration testing. For ease of illustration, only a portion of the testing unit 21 as depicted in FIGS. 2 to 4b is shown in FIG. 15. Disposed between bottom plate 36 and baffle 44 is a thermally insulated enclosure 154 defining a thermal cavity 156 within which an article to be tested such as PCB 41 is contained, which PCB 41 is mounted on baffle 44 in a same manner as described above. The thermally insulated enclosure is formed by four walls 156, 158, 160, 162 that can be made from stainless or galvanized steel sheets provided with an outer layer made of a thermally insulating material. The wall 158 is provided with a first opening 164 forming an enclosure inlet in fluid communication with the proximal end of a fluid supply line 166 having its distal end coupled to outlet 168 a heating/cooling unit generally designated at 170. The wall 162 is provided with a second opening 172 forming an enclosure outlet in fluid communication with the proximal end of a fluid return line 174 having its distal end coupled to return inlet 176 provided on heating/cooling unit 170. While in most testing applications, air is conveniently used as thermal transfer fluid, other inert gas exhibiting equivalent or better thermal transfer characteristics may be used. In the case where air is used as the heat transfer fluid, the heating/cooling unit 170 is provided with mechanical means for generating a flow of air in the form of a conventional air blower 178 forcing input air received from return inlet 176 through heating coil 180 of an electrical heating device generally designated at 182 provided with heat controller 184. It is to be understood that any other type of heating device, such as fuel or gas burner, may be used as heat source. Also provided on unit 170 is a cooling device generally designated at 186 which includes a supply tank 188 containing a pressurized freezing fluid such as liquid nitrogen and being in fluid communication through main valve 190 and supply line 192 provided with electromechanically-controlled valve 194 to a nozzle 196, where heat absorption due to evaporation of liquid nitrogen causes cooling of inert gas as it flows out of outlet 168, before entering the thermally insulated enclosure through opening 164, and circulating into the thermal cavity 156. Located within thermal cavity 156 is a first temperature sensor 198 such as a standard T' type thermocouple for producing a first temperature indicative signal that is directed through electrical line 200 to signal input 202 of a feedback control device 204 as part of a temperature controller unit generated designated at 206. The first sensor means 198 is solely In contact with fluid flow whereby the first signal generated therefrom is indicative of the temperature of the heated/cooled inert gas. The control device 204 has a first control output 208 for directing a heating control signal to heat controller 184 through control line 210, and has a second control output 212 for directing a cooling control signal to controlled valve 194 through control line 214. The control device is programmed to selectively activate either heating device 170 or cooling device 186 according to said predetermined thermal cycling profile, in response to the received temperature indicative signal. The temperature controller unit 206 further includes a microcomputer 216 of a conventional type having display 218 and memory schematically represented at 220, into which predetermined thermal cycling profile data is stored, as will be explained later in more detail. The computer 216 is also provided with a suitable input/output interface linked to control device 204 through input and output lines 222, 224, respectively. The microcomputer 216 runs a control software that is programmed to send through line 224 control parameter data according to the thermal cycling profile data stored in memory 220, which control data indicate temperature-related set point values for feedback control as a function of time. Current control parameters setting of control device 204 may be also received by the microcomputer 216 through line 222. Also located within thermal cavity 156 is one or more further temperature sensors 226, 226' directly disposed onto article 41 for producing article temperature indicative signals, which are directed to an analog-to-digital converter 228 through respective lines 230, 230'. For example, a standard "T" type thermocouple may by used as sensor 226 while a "K" type thermal probe such as manufactured by Sanders Technology may be used as further sensor 226'. Through digital data line 232 interfaced with computer 216, the resulting digital signals are sent to computer 216 through digital data line 232 interfaced therewith, and the computer 216 stores in memory 220 corresponding temperature values data in response to the received digital signal which data may be used for adjusting cycling profile data accordingly, be displayed or be otherwise processed.

The operation of the preferred embodiments of the vibration testing apparatus and method according to the present invention will now be explained. According to conventional ESS procedures for testing printed circuit boards, determination of the vibration spectrum required for testing a particular PCB is usually an empirical matter. Induced fatigue and precipitation of latent defects are generally not estimated considering the actual stress within the circuit, but are rather empirically estimated from the vibration level as measured. Types of defects that are precipitated with a stimulation using random vibrations are mainly related to poor solders, component or substrate defects, connector problems, poor securing of cables and components, and structural problems. Methods of determining the spectrum of a vibrating stimulation typically range from the study of vibrating behavior and the comparison of the global response to predetermined optimum vibration levels, to the use of spectrums previously used with success for other products. An intermediary method consists of introducing typical defects in a product and then increasing the vibration level until these defects repetitively precipitate. Time length of the vibrating stimulation is typically of about 10 minutes. Known methods of determining the vibrating stimulation spectrum to apply for a particular product can be also employed where the vibration apparatus and method according to the present invention are used to impart vibration to an article under test, considering characteristics of the energy transfer from the applied acoustical field to the induced vibrations. However, in order to improve efficiency of these known methods, structural model characterizing the vibration response of a product can be built prior to determine the spectrum of vibrating stimulation likely to produce the target frequency response profile. For this purpose, modal analysis techniques may be used, such as those described in the inventor's papers "Modal analysis of electronic circuit using acoustical sources",$4^{th}$ Annual IEEE Accelerated Stress Testing, 1998, and "Experimental modal analysis using acoustical sources", $17^{th}$ Canadian Congress on Applied Mechanics, 1999, which papers are incorporated herein by reference. Modal analysis essentially consists in establishing a theoretical model in terms of vibration parameters including resonance frequencies and damping factor associated with main modes of vibration. Then, values for these vibration parameters are determined experimentally using either a mechanical or acoustical source of vibration with a conventional vibration measuring instrumentation. Alternatively, these vibration parameter values can be estimated through known finite element analysis, which may be also used for defining border conditions of the fixture on which is mounted the article. From the obtained vibration parameters values, vibrating stimulation levels required to comply with ESS testing requirements can be predicted as well as optimal vibration spectrums.

Figure 11:
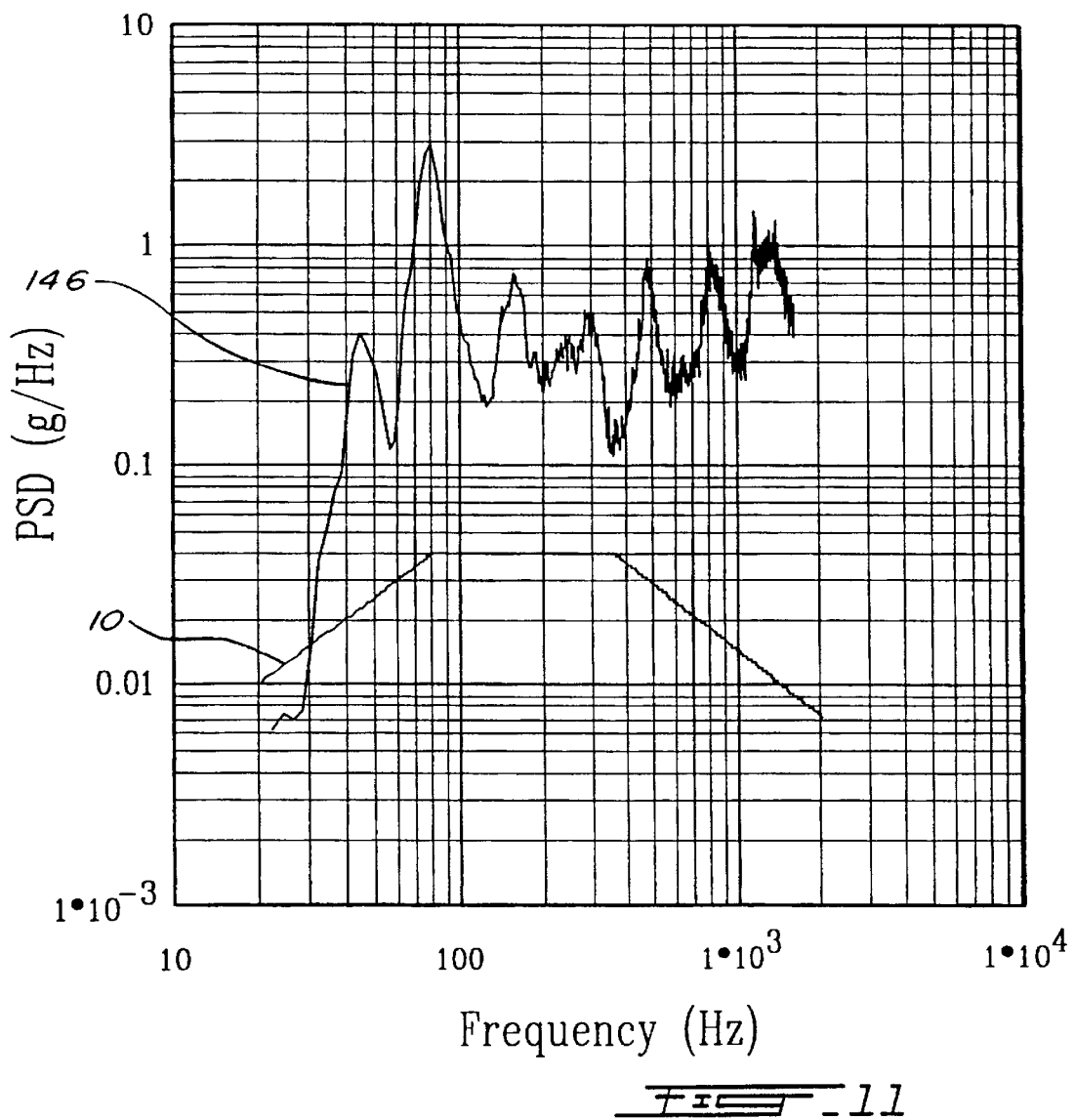
FIG. 11 is a graph plotted on logarithmic scales showing the Power Spectral Density reference curve according to NAVMAT-9492 with an experimental frequency response curve obtained for the printed circuit board referred to in FIG. 1, but tested with an apparatus according to the present invention, using the first connecting configuration of FIG. 9.

Referring now to the drawings, an example of ESS application for testing a PCB according to the present invention will now be described. Once the vibration spectrum and level have been determined for the PCB 41 to be tested, the controller 124 as shown in FIG. 9 is programmed and the power levels of amplifiers 138 and 139 are set accordingly. An output polarity is also selected between the configurations using either line 137 or line 137' respectively. Turning now to FIG. 4*a*, the control unit 73 is then operated to cause the lift 28 to raise the upper loudspeaker module 34 to a position where there is sufficient clearance between the bottom plate 36 thereof and the baffle 44 of the cover portion 42 to allow mounting of an article to be tested. As shown in FIG. 3, the PCB 41 is mounted on the fixture 52 and the clamps 49 are firmly brought in their closed position. If a pair of PCB's 41 and 41' as shown in FIG. 7 have to be tested, the PCB 41 is first mounted on the fixture 100 by first setting the PCB's edge onto the mounting blocks 81' with first rubber pads 95 therebetween. Then the removable spacer blocks 108 linked as a modular assembly by the second frame 112 are set in place along spacer blocks 102 onto the PCB's edge with second rubbers pads 95' disposed therebetween. The second PCB 41' is finally is mounted onto the tabs 114 of the removable spacer blocks 108 with mounting spacers 94' and rubber pads 95', and the clamps 49 are firmly brought in their closed position. Once the door 24 of the acoustical insulation chamber 22 is closed, one may proceed with testing. Referring now to FIG. 11, a Power Spectral Density reference curve 12 according to NAVMAT-9492 is plotted with an experimental frequency response curve 146 obtained for the printed circuit board referred to in FIG. 1, which PCB did not have its components mounted thereon and as tested using the first connecting configuration of FIG. 9 using output line 137 . As opposed to the profile obtained for the same PCB with a prior art system devoid of baffle and as depicted in FIG. 1, with a nominal vibration (acceleration) level estimated at 28.9 grms, it can be seen that the PSD values obtained with an apparatus according to the present invention are well beyond corresponding values given by the reference curve 10 for substantially the whole vibration spectrum employed within the 20 to 2000 Hz range. More specifically, it can be seen from FIG. 1 that the frequency response in the lower part of the operating bandwidth under a crossover frequency of 160 Hz, apart from a non-significant 20–30 Hz lower limit range, is substantially higher than the target PSD reference curve 10, being and indication that the level of stress applied to the article under test is sufficient, and may even reach a higher nominal vibration level as desired by the operator. Total negative and positive variations of about respectively 0.205 grms and 28.4 grms were obtained, compared to 4.3 grms and 13.9 grms obtained with the prior art system giving results shown in FIG. 1 as explained before. It is therefore apparent that an efficient control over the low frequency response can be obtained with an apparatus and method according to the present invention, to allow reliable and effective ESS testing.

Figure 12:
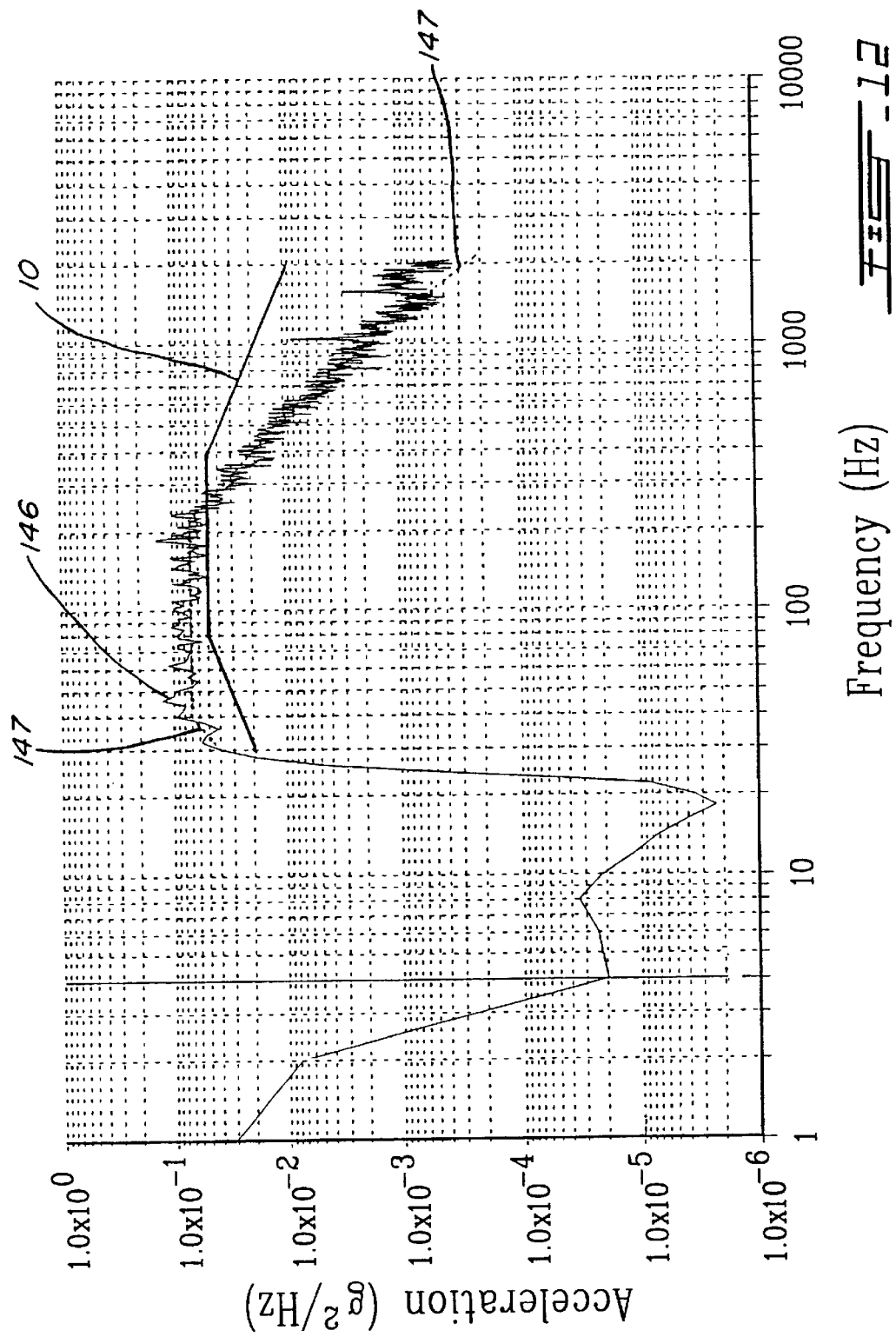
FIG. 12 is a graph plotted on logarithmic scales showing the Power Spectral Density reference curve according to NAVMAT-9492 and an experimental frequency response curves obtained with a first example of excitation signal for a printed circuit board with components as tested employing an apparatus according to the present invention which uses the first connecting configuration of FIG. 9.

Referring now to FIG. 12, a Power Spectral Density reference curve 10 according to NAVMAT-9492 is plotted with an experimental frequency response curve 146 which has been superimposed on the controlled excitation signal curve 147 having a crossover frequency of 160 Hz and as plotted in dotted line, which curve 146 was obtained for a printed circuit board having its components mounted thereon which was tested using the first connecting configuration of FIG. 9 using output line 137 . It can be seen that frequency response curve 146 substantially fits with the excitation signal curve 147. As can be seen from FIG. 12, it is to be understood that depending upon the testing requirements, the excitation signal can be set according to a different profile as compared with the NAVMAT-9492 which may be used as a guideline.

Referring now to FIG. 13, there is shown an experimental frequency response curve 149 obtained with a second example of excitation signal represented by curve 151 for the same printed circuit board as referred to in FIG. 12 and using the apparatus employing the first connecting configuration of FIG. 9. In this example, the main resonance frequencies of the printed circuit board was previously identified with a modal analysis made according to a known technique such the methods referred to before. Then, the excitation signal profile was determined in a such manner to concentrate excitation energy around the resonance frequencies as well as on the lower portion of the frequency spectrum, to enhance power efficiency. Here again, It can be seen that the frequency response curve 149 substantially fits with the excitation signal curve 151.

Turning now to FIGS. 14*a* and 14*b*, it can be seen that the current profile for curves 150 and 150' representing excitation input signal after crossover filtering as obtained using the first and alternate connecting configurations as shown in FIG. 9 and 9*a* respectively, are substantially similar, excepted for areas 152 and 152' within the range extending from 115 to 190 Hz near the crossover cutoff frequency set at 160 Hz for both curves. It is to be pointed out that both curves 150 and 150' are associated with a substantially identical frequency response PSD profile. The average current within area 152' being significantly lower than average current of area 152, a corresponding power reduction will result, which can be readily estimated as being $(1-(7.14^2/18.0^2)=84\%$. Therefore, an accurate control over the power spectral density profile in the area of the crossover frequency is obtained without affecting power spectral efficiency, and without adversely increasing the overall acoustic level in the testing chamber, to contribute providing a more comfortable working environment.

Turning now to FIG. 16, there are shown typical cycling temperature response curves 232, 234 and 236 as obtained with the thermal control subsystem of FIG. 15 provided with a set of temperature sensors, namely standard thermocouple 198, thermal probe 226' and standard thermocouple 226, while imparting vibration to a PCB under test. In the example shown, a predetermined profile for performing thermal cycling stress screening of the PCB and as previously stored in the computer memory was selected by a user. Characteristics of the selected cycling profile were determined according to well known criteria, including cycle characteristics (low temperature, high temperature, product thermal response rate, dwell times at temperature extremes), number of thermal cycles and PCB condition (powered, unpowered, monitored, unmonitored). Determination of thermal cycling characteristics are discussed in detail in (<<Environmental Stress Screening Guidelines for Assemblies >>, Institute of Environmental Sciences, March 1990, and <<Product Reliability Division Recommended Practice 001.1, Management and Technical Guidelines for the ESS Process >> Institute of Environmental Sciences and Technology, January 1999, the whole content of which is incorporated herein by reference. Thermal rate of change values in ° C./min for successive portions of curves 232, 234, 236 defined by time intervals AB (first heating phase), BC (second heating phase), AC (total heating phase) and CD (cooling phase) shown in FIG. 16 corresponding to a first thermal cycle and as measured in airflow with standard thermocouple 198, and directly on article with standard thermocouple 230 and thermal probe 230', are given in Table 1.

TABLE 1

| Thermal rate of change ° C./min | Airflow standard thermocouple | Article standard thermocouple | Article thermal Probe |
| --- | --- | --- | --- |
| AB | 83.9 | 25.8 | 36.8 |
| BC | 17.6 | 13.3 | 15.3 |
| AC | 31.7 | 16.1 | 25.4 |
| CD | −166.0 | −80.2 | −131.7 |

As expected, due to article and sensors thermal response characteristics, It can be U' seen from examination of first cycle of curves 232, 234 and 236 that maximum temperature value measured in airflow with standard thermocouple 198 is higher that corresponding maximum temperature values as measured directly on the article with standard thermocouple 226 and thermal probe 226', and that minimum temperature value measured in airflow with standard thermocouple 198 is lower than corresponding minimum temperature values as measured on the article by sensors 226, 226'. It can also be observed from FIG. 16 that temperature gap defined by maximum and minimum temperature values as measured in airflow is more important that corresponding gaps obtained with sensors 226, 226'. Furthermore, it can be concluded from the data given in Table 1 that thermal rate of change values measured in airflow with thermal probe 198 are also higher than corresponding thermal rate of change values measured on article with sensors 226, 226'. To compensate for Inherent variations between airflow temperature measurements and article temperature measurements, the computer 220 shown in FIG. 15 is preferably programmed to adjust cycling profile data according to article temperature measurements, to increase performance of temperature control device 204.

What is claimed is:

1. A vibration testing apparatus comprising:
    a main enclosure defining a main acoustical cavity and having a baffle provided with at least one main opening;
    an acoustical source having at least one acoustical transducer being acoustically coupled to said main acoustical cavity to generate low frequency acoustical waves toward said opening;
    wherein said apparatus receives an article to be tested in a position where said main opening is substantially closed by the article to expose a surface thereof to said acoustical wave while attenuating the portion of the acoustical waves reaching a substantially opposed surface of said article which is not directly exposed to the acoustical waves.

2. A vibration testing apparatus according to claim 1, wherein said acoustical source comprises a driver means being coupled to said acoustical traducer.

3. A vibration testing apparatus according to claim 2, wherein said driver means comprises a controller for generating an excitation input signal having a desired frequency spectrum and an amplifier for generating therefrom an electrical output signal to be fed to said acoustical transducer.

4. A vibration testing apparatus according to claim 3, further comprising a vibration sensor adapted to be coupled to said article for generating a vibration indicating signal, said controller comparing characteristics of the vibration indication signal in feedback with reference excitation signal data to generate said excitation input signal.

5. A vibration testing apparatus according to claim 3, further comprising an acoustical sensor disposed near said main opening for generating a sound pressure indicating signal, said controller comparing characteristics of the sound pressure indicating signal in feedback with reference excitation signal data to generate said excitation input signal.

6. A vibration testing apparatus according to claim 3, wherein said controller compares characteristics of the excitation input signal in feedback with reference excitation signal data to generate said excitation signal.

7. A vibration testing apparatus according to claim 1, further comprising an acoustic insulation chamber for containing said main enclosure and said acoustical transducer.

8. A vibration testing apparatus according to claim 1, further comprising:
    acoustical insulation means adapted to receive the article;
    an attachment means for securing the article in said position, wherein said main opening is further closed by said acoustical insulation means.

9. A vibration testing apparatus according to claim 8, wherein said article comprises a printed circuit board, said acoustical insulation means comprising one or more seals made of a resilient acoustical insulating material and forming a generally closed perimeter bounding the periphery of the printed circuit board.

10. A vibration testing apparatus according to claim 9, wherein said attachment means comprises at least one fixture including a generally rectangular frame and a plurality of clamps distributed and adjustably mounted thereon, said frame being secured on the baffle in substantial alignment with said main opening, each said clamp being adapted to receive a portion of the periphery of the printed circuit board for rigidly maintaining thereof when the clamp is in a closed position.

11. A vibration testing apparatus according to claim 8, further comprising:
    at least one further acoustical insulation means adapted to receive in overlapping, parallel spaced relationship with said article a further article to be tested;
    at least one secondary enclosure defining a secondary acoustical cavity with a further opening;
    at least one further attachment means for securing the further article in a position where said further opening is substantially closed by the further article and the further acoustical insulation means to the attenuate portion of the acoustical waves reaching a substantially opposed surface of said further article which is not directly exposed to the acoustical waves, attenuating the opposed phase acoustical annihilation occurring at the opposed surface of the further article.

12. A vibration testing apparatus according to claim 11, wherein each said article comprises a printed circuit board, each said acoustical insulation means comprising one or more seals made of a resilient acoustical insulating material and forming a generally closed perimeter bounding the periphery of the respective printed circuit board.

13. A vibration testing apparatus according to claim 12, wherein both said attachment means are combined in a single fixture including a generally rectangular frame and a plurality of clamps distributed and adjustably mounted thereon, said frame being secured on the baffle in substantial alignment with both said openings, each said clamp being adapted to receive portions of the periphery of both said printed circuit boards for rigidly maintaining thereof when the clamp is in a closed position.

14. A vibration testing apparatus according to claim 11, further comprising a further acoustical source having at least one further acoustical transducer being disposed outside said main acoustical cavity and facing said secondary enclosure, to generate acoustical waves toward said further article for imparting further vibration thereto.

15. A vibration testing apparatus according to claim 14, wherein each one of said further acoustical sources comprises a driver means being coupled to said acoustical transducers.

16. A vibration testing apparatus according to claim 15, wherein said acoustical transducer and said further acoustical transducer are directed toward one another with said baffle transversely extending therebetween, said acoustical transducers being characterized by complementary frequency operating ranges.

17. A vibration testing apparatus according to claim 16, wherein said acoustical transducers are fed by corresponding said driver means respectively with first and second electrical output signals having respective complementary frequency spectrums adjacent a crossover cutoff frequency.

18. A vibration testing apparatus according to claim 17, wherein one of said corresponding driver means is coupled in inverted polarity to a corresponding one of said acoustical transducers whereby said first and second electrical output signals are substantially in opposed phase relationship in the area of the crossover cutoff frequency to further increase power efficiency only within the area of said crossover cutoff frequency.

19. A vibration testing apparatus according to claim 18, wherein each said driver means includes a controller for generating an excitation input signal having a desired frequency spectrum said driver means also including a crossover filter and an amplifier for generating therefrom said electrical output signals.

20. A vibration testing apparatus according to claim 19, further comprising a vibration sensor adapted to be coupled to at least one said articles for generating a vibration indicating signal, said controller comparing characteristics of said vibration signal in feedback with reference excitation signal data to generate said excitation input signal.

21. A vibration testing apparatus according to claim 19, further comprising an acoustical sensor disposed near said main opening for generating a sound pressure indicating signal, said controller comparing said acoustical level signal with reference excitation signal data to generate said excitation input signal.

22. A vibration testing apparatus according to claim 19, wherein said controller compares characteristics of the excitation input signal in feedback with reference excitation signal data to generate said excitation input signal.

23. A vibration testing apparatus according to claim 1, further comprising a further acoustical source having at least one further acoustical transducer being disposed outside said main acoustical cavity and facing said baffle, to generate acoustical waves toward the article for imparting further vibration thereto.

24. A vibration testing apparatus according to claim 23, wherein said further acoustical source comprises a driver means being coupled to said further acoustical transducer.

25. A vibration testing apparatus according to claim 24, further comprising an acoustic insulation chamber for containing said main enclosure and both said acoustical transducers.

26. A vibration testing apparatus according to claim 24, wherein said baffle substantially extends in a horizontal plane, said apparatus further comprising a lift for adjustably holding the further acoustical transducer in a spaced relationship with the baffle.

27. A vibration testing apparatus according to claim 23, wherein said acoustical transducer and said further acoustical transducer are directed one towards another with said baffle transversely extending therebetween, said acoustical transducers being characterized by complementary frequency operating ranges.

28. A vibration testing apparatus according to claim 27, wherein said acoustical transducers are fed by corresponding driver means respectively with first and second electrical output signals having respective complementary frequency spectrums adjacent a crossover cutoff frequency.

29. A vibration testing apparatus according to claim 28, wherein one of said corresponding driver means is coupled in inverted polarity to a corresponding one of said acoustical transducers whereby said first and second electrical output signals are substantially in opposed phase relationship In the area of the crossover cutoff frequency to further increase power efficiency only within the area of said crossover cutoff frequency.

30. A vibration testing apparatus according to claim 29, wherein each said driver means includes a controller for generating an excitation input signal having a desired frequency spectrum, said driver means also including a crossover filter and an amplifier for generating therefrom said electrical output signals.

31. A vibration testing apparatus according to claim 30, further comprising a vibration sensor adapted to be coupled to said article for generating a vibration level signal, said controller comparing characteristics of said vibration indicative signal in feedback with reference excitation signal data to generate said excitation input signal.

32. A vibration testing apparatus according to claim 30, further comprising an acoustical sensor disposed near said main opening for generating a sound pressure indicating signal, said controller comparing characteristics of said sound pressure indication signal in feedback with reference excitation signal data to generate said excitation input signal.

33. A vibration testing apparatus according to claim 30, wherein said controller compares the excitation input signal data in feedback with reference excitation signal data to generate said excitation input signal.

34. A vibration testing apparatus according to claim 1, further comprising:
   a thermally insulated enclosure defining a thermal cavity within which said article is contained;
   means for generating a flow of inert gas;
   means for heating said flow of inert gas;
   means for cooling said flow of inert gas;
   means for circulating said flow of inert gas into said thermal cavity;
   first sensor means located within said thermal cavity for producing a first temperature indicative signal;

controller means responsive to said temperature indicative signal and operatively coupled to said heating means and said cooling means for controlling the temperature of one of said inert gas and said article by selectively activating one of said heating means and said cooling means according to a predetermined thermal cycling profile while said acoustical source generates said acoustical waves toward the exposed surface of said article.

35. A vibration testing apparatus according to claim 34, wherein said first sensor means located within said thermal cavity is solely in contact with said flow whereby said first signal is indicative of the temperature of said Inert gas, said apparatus further comprising further sensor means disposed onto said article for producing an article temperature indicative signal, and wherein said controller means includes a computer having a memory and being responsive to said article temperature indicative signal for storing thereof in said memory.

36. A vibration testing method comprising the steps of:
   a) providing an acoustical insulation chamber containing first and second acoustical transducer means facing one another, said first and second acoustical transducer means being characterized by complementary frequency operating ranges;
   b) securing at least one article to be tested in a position between said acoustical transducer means within said chamber; and
   c) driving said first and second acoustical transducer means with corresponding first and second electrical output signals to cause generation of acoustical waves for imparting vibration to said article, said first and second output signals having respective complementary frequency spectrums adjacent a crossover cutoff frequency and being substantially in opposed phase relationship in the area of the crossover cutoff frequency.

37. A vibration testing method according to claim 36, further comprising before said step c) the steps of:

i) generating a flow of inert fluid; and
   ii) selectively performing one of a heating step and a cooling step to said inert fluid according to a predetermined thermal cycling profile; said method further comprising simultaneously to said step c) the steps of:
   iii) circulating said flow of inert fluid between said first and second acoustical transducer means; and
   iv) controlling the temperature of said inert fluid according to a predetermined thermal cycling profile while said acoustical source generates said acoustical waves toward the exposed surface of said article.

38. A vibration testing method comprising the steps of:
   a) providing a main enclosure defining a main acoustical cavity and having a baffle provided with at least one main opening;
   b) disposing at least one article to be tested in a position where said main opening is substantially closed by the article to expose a surface thereof to acoustical waves of low frequency range while attenuating the portion of the acoustical waves reaching a substantially opposed surface of said article which is not directly exposed to the low frequency acoustical waves; and
   c) generating acoustical waves within a low frequency spectrum toward said opening and said at least one test article.

39. A vibration testing method according to claim 38, further comprising the step of:
   d) generating acoustical waves within a frequency spectrum higher to said low frequency spectrum toward said opposed article surface, said low and higher frequency spectrums being complementary adjacent a crossover frequency and being substantially in opposed phase relationship in the area of the crossover frequency to further increase power efficiency in said frequency area.

* * * * *

UNITED STATES PATENT AND TRADEMARK OFFICE
CERTIFICATE OF CORRECTION

PATENT NO. : 6,668,650 B1
DATED : December 30, 2003
INVENTOR(S) : François Lafleur et al.

It is certified that error appears in the above-identified patent and that said Letters Patent is hereby corrected as shown below:

Column 7,
Line 22, "41'" should read -- 41 --.

Column 10,
Line 40, before "13 dB" insert -- 22 dB/octave which corresponds to a gain attenuation of about --.

Column 15,
Line 24, cancel "U'".

Signed and Sealed this

Eighteenth Day of May, 2004

JON W. DUDAS
*Acting Director of the United States Patent and Trademark Office*